United States Patent
Riggins et al.

(10) Patent No.: US 8,566,023 B2
(45) Date of Patent: Oct. 22, 2013

(54) MISSING CHILD REPORTING, TRACKING AND RECOVERY METHOD AND SYSTEM

(75) Inventors: Scott A. Riggins, Missouri City, TX (US); David P. Sharp, Houston, TX (US)

(73) Assignee: Scott A. Riggins

( * ) Notice: Subject to any disclaimer, the term of this patent is extended or adjusted under 35 U.S.C. 154(b) by 520 days.

(21) Appl. No.: 12/751,123

(22) Filed: Mar. 31, 2010

(65) Prior Publication Data

US 2010/0262367 A1    Oct. 14, 2010

Related U.S. Application Data

(60) Provisional application No. 61/211,487, filed on Mar. 31, 2009.

(51) Int. Cl.
  *G01C 21/34* (2006.01)
  *G06Q 99/00* (2006.01)
  *G01C 21/26* (2006.01)

(52) U.S. Cl.
  CPC ............ *G06Q 99/00* (2013.01); *G01C 21/26* (2013.01)
  USPC .............. 701/410; 455/404.1; 455/404.2; 340/531; 705/500

(58) Field of Classification Search
  CPC ..................... G06Q 30/0284; G06Q 99/00
  USPC ............ 701/209; 455/404.1, 404.2; 340/531; 707/104.1; 702/19; 705/14.1, 500
  See application file for complete search history.

(56) References Cited

U.S. PATENT DOCUMENTS

| 5,521,826 | A | 5/1996 | Matsumoto |
| 6,175,803 | B1* | 1/2001 | Chowanic et al. ............ 701/533 |
| 2003/0229452 | A1* | 12/2003 | Lewis et al. ..................... 702/19 |
| 2005/0086261 | A1* | 4/2005 | Mammone ................. 707/104.1 |
| 2006/0239546 | A1* | 10/2006 | Tedesco et al. ............... 382/159 |
| 2007/0072583 | A1* | 3/2007 | Barbeau et al. ............ 455/404.2 |
| 2008/0113614 | A1 | 5/2008 | Rosenblatt |
| 2008/0235044 | A1* | 9/2008 | Raskob ............................. 705/1 |
| 2010/0036717 | A1* | 2/2010 | Trest ............................ 705/14.1 |

FOREIGN PATENT DOCUMENTS

| GB | 2409363 A | * | 6/2005 |
| WO | WO 03062968 A1 | * | 7/2003 |

OTHER PUBLICATIONS

U.S. Appl. No. 61/164,026, filed Mar. 27, 2009 by Anthony Phills.*

* cited by examiner

*Primary Examiner* — Ryan Zeender
*Assistant Examiner* — Hunter Wilder
(74) *Attorney, Agent, or Firm* — Robert W Strozier; Terry Lester

(57) ABSTRACT

A method and system for marshaling resources needed to search for a missing child, declaring a missing child incident, coordinating a search for the missing child, tracking the progress of the search, locating the missing child, and recovering the missing child.

28 Claims, 15 Drawing Sheets

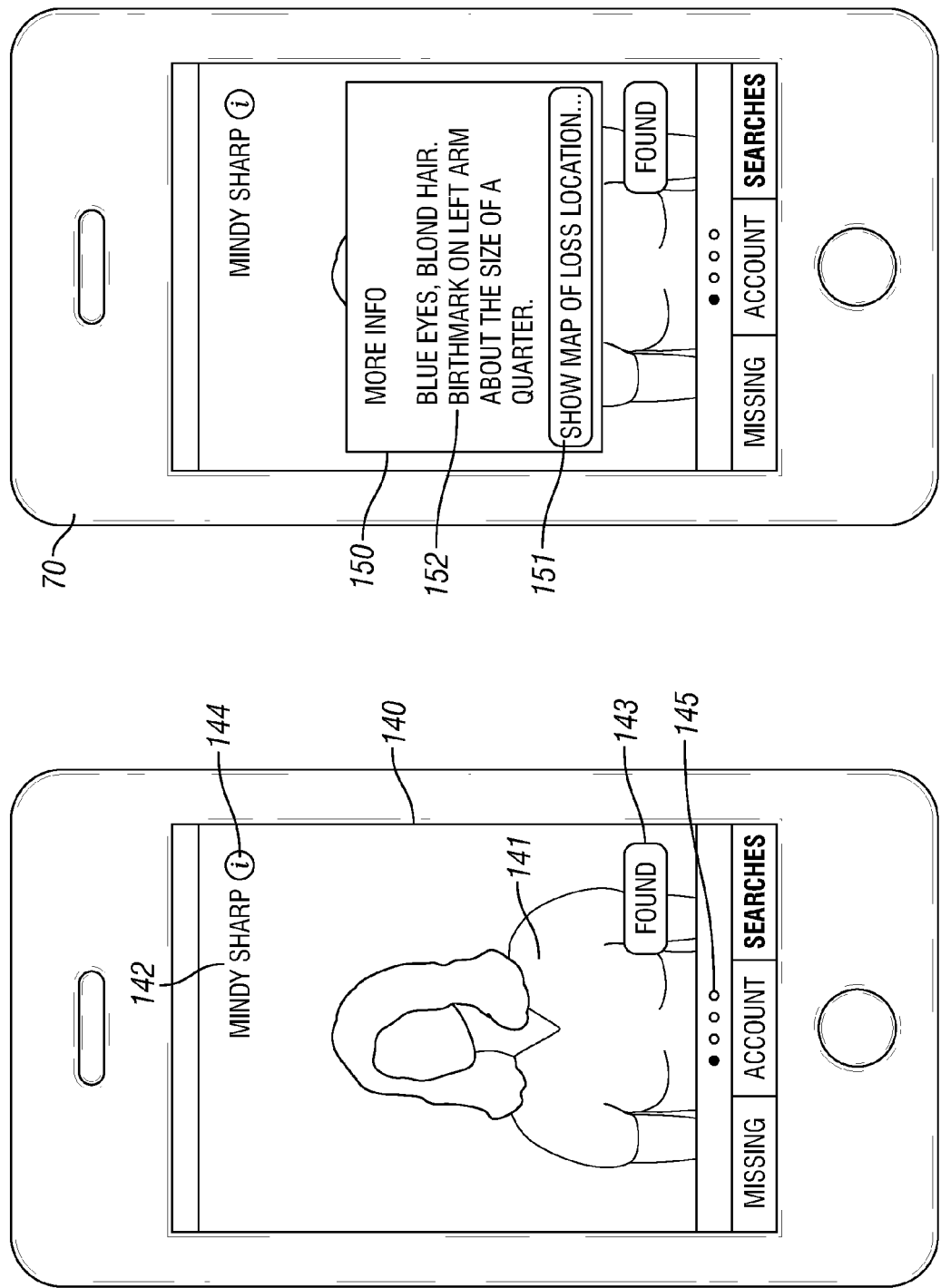

MISSING CHILD REPORTING, TRACKING AND RECOVERY METHOD AND SYSTEM

RELATED APPLICATIONS

This applications claims the benefit of and priority to U.S. Provisional Patent Application Ser. No. 61/211,487, filed 31 Mar. 2009 (Mar. 31, 2009).

BACKGROUND OF THE INVENTION

1. Field of the Invention

Embodiments of the present invention relate to apparatuses, systems and methods for marshaling resources needed to search for a missing child, declaring a missing child incident, coordinating a search for the missing child, tracking the progress of the search, locating the missing child, and recovering the missing child.

2. Description of the Related Art

Communication systems such as radio and television broadcast networks, facsimiles, telegraph services, wired and wireless telephone systems, and computer driven display systems are known that may be used to communicate the loss of a missing child to the public.

Such systems have been used to convey information by way of one-way communications, not only to the public, but also to law enforcement authorities. Thereafter, the child's Guardian or family typically relies on law enforcement to follow through to a successful recovery of the missing child.

Systems including Tracalert are known that require a device to be located on the person of the user. By detecting signals emitted by the device, the user of the system is located. Such systems require maintenance of a special-purpose device, do not provide for the contingency of the user or child being separated from the device, and do not provide for the coordination of a search, or the location and recovery of a lost child.

Further, a number of universities have campus alert systems where a student communicates by way of a cell phone his/her starting location, and the expected time of arrival at a cross-campus location. If no notice of arrival is received from the student within an expected travel time, campus police are alerted to commence a search. The campus system does not, however, address a search, track, location, or recovery of a lost person.

In addition, GTX Corp of 117 West Ninth Street, #1214, Los Angeles, Calif. 90015, markets a personal location services (PLS) platform that is part of a system that may include miniaturized GPS tracking and cellular location-transmitting products. The system requires that a locating device be worn by the subject, and does not provide for the search for a missing person beyond the location of the device.

US Patent Application No. 2008/0113614 discloses a system requiring not only a device on the person of the child, but also a device on the person of the Guardian. A location program is executed through a distributed network to locate the child. No provision is disclosed for locating the lost child if separated from the device, for coordinating a search effort, for tracking the progress of a search, for enlisting the aid of others, for escalating a missing child incident if a risk of danger arises or the scope of enlisted resources falls short of need, or for recovering the lost child.

The Code Adam search facility is a well known and largely manual search process where employees of a participating establishment are provided a verbal announcement that a child is lost in the building, and sometimes provided a verbal description of the child and the clothes the child was wearing at the time of the loss incident. If the child is not found within ten minutes, law enforcement is called. Again, there are no proactive exchanges with Responders to coordinate and track a search process, and there is no provision for escalating the search if the child is believed to be in danger, or if the search process requirements exceed the scope of available search resources.

The Amber Alert Program is a known partnership among law enforcement agencies, broadcasters, and transportation agencies that act to broadcast a missing child's description and image, and thereby galvanize an entire community to assist in searching for the child. "Wireless Amber Alert" is an associated initiative that distributes Amber Alerts across a broad geographic region to wireless subscribers whose carrier participates in the Wireless Amber Alert. The Amber Alert Program is limited to children 17 years or younger, and requires reasonable belief by a law enforcement agency that the child is in imminent danger, and that an abduction has occurred. Further, registration of the incident with the National Crime Information Center is required before publication of the incident occurs. Delays of 24 hours are common. No tracking of information flows or coordination of search efforts occurs.

Other systems with limited utility are known that require an initial gathering of pre-event information such as identity, contact information, and photos for display through cell phone communications to a select group of friends or Responders. In these systems, the child is required to display his stored information to bystanders. Further, such systems fail to publish the existence of a missing child incident, and fail to follow through by coordinating a search, locate, and recovery effort. Nor do such systems have any facility for dynamically preparing, updating, and sharing search information among designated participants after the child is declared missing, or for escalating the search to include added resources such as search and rescue services, broadcast facilities such as satellite communications and broadcast networks, or raising the risk assessment as the need arises.

SUMMARY OF THE INVENTION

Embodiments of a method and system are disclosed that provide for pre-incident information or pre-incident profile information such as the name and age of a child, a current clothing and physical description, photographs of the child, voice recordings of the child, and both identifying data and preference data of a Guardian as well as potential Responders, all of which is stored in a system database for later use in the event of a missing child incident. Users are automatically reminded to keep current pre-event information including their pre-event profile information. When a missing child incident occurs, incident data including time, day, location, and circumstances of the incident are stored for later sharing with all participants in the search. Immediately thereafter, marshalling of participants in the search including bystanders, Guardians, friends, employees of near-to-incident businesses, members of the general public, federal and state authorities, and private search groups is commenced. Throughout the search process, the search progress is tracked, the search efforts are coordinated, and identifying data and incident data are shared, by means of a dynamically updated database that is kept current through ongoing communication with all participating parties.

Control of the search process may be transferred from the Guardian to the system of embodiments of the invention at any time after the Guardian declares that the child is missing. This allows the Guardian to immediately focus on his/her personal search for the child, while the system marshals and coordinates aid from additional resources on his/her behalf. The system provides recent photographs and other identifying information of the missing child to the Guardian and to marshaled resources so as to improve the ability to recognize the missing child, and to allow quick and accurate communication of the description of the missing child to additional persons who were not marshaled by the system but who nevertheless desire to aid in the search.

Upon the location of the missing child by any marshaled resource, the methods and systems of embodiments of the present invention are used to coordinate the recovery and return of the missing child to the Guardian. Upon recovery of the missing child by the Guardian, the system of the embodiments is used to notify all of the marshaled resources that the child has been recovered.

The process of marshaling resources and coordinating the search process through to recovery of the child by the Guardian is entirely automated, but may be augmented by human input as efficiency and effectiveness of the search, track, coordinate, locate and recovery efforts demand.

BRIEF DESCRIPTION OF THE DRAWINGS

The invention can be better understood with reference to the following detailed description together with the appended illustrative drawings in which like elements are numbered the same:

FIG. 10 depicts the primary Searches user interface of the System Device Software;

DETAILED DESCRIPTION OF THE INVENTION

Figure 1:
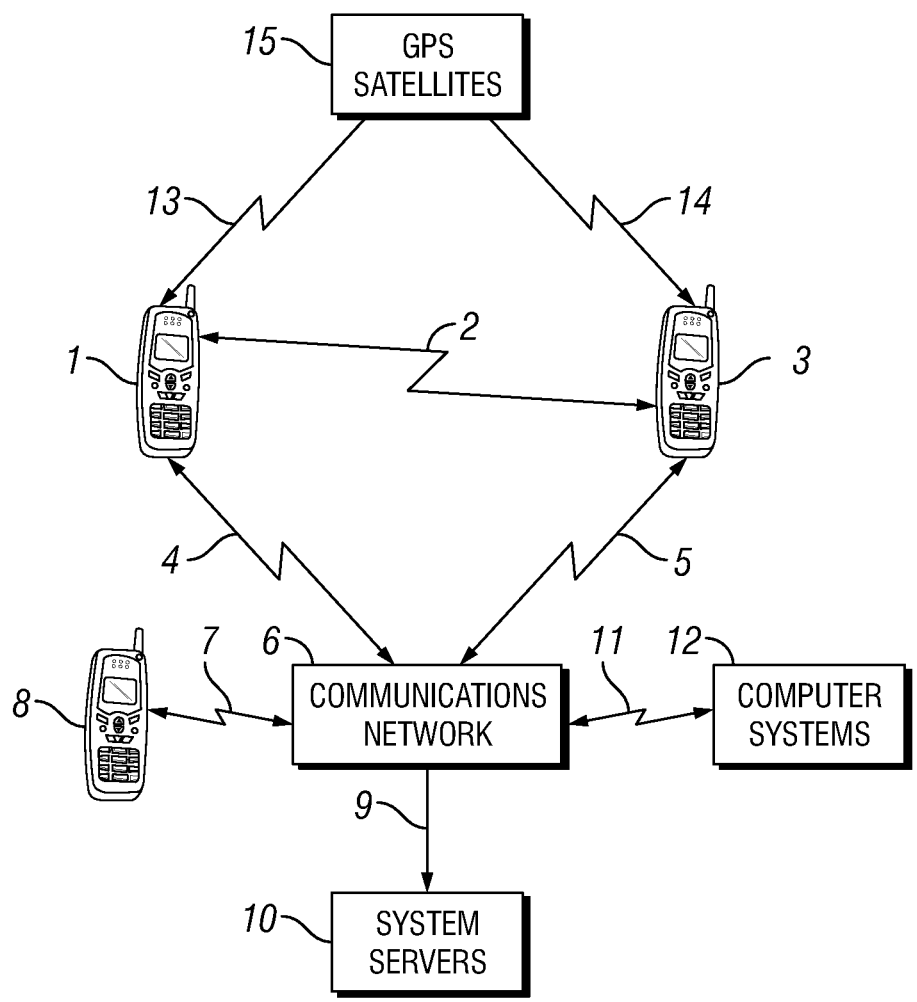
FIG. 1 is a functional block diagram of the system of an embodiment of the present invention.

Embodiments of the invention are now described with reference to the drawings to enable any person skilled in the art to make and use such embodiments. In the description, same components of the embodiments are referred to by same reference numbers.

DEFINITIONS

The following defined terms and symbols apply throughout this specification:

"GPS" means NAVSTAR-GPS, as developed by the United States Department of Defense, is a system of 24 or more satellites allowing GPS-enabled receivers to determine their own location, speed, direction, and time of day. The GPS satellites are maintained by the United States Air Force 50th Space Wing.

"SMS" means a communications protocol that allows the sending of short text messages among mobile telephone devices. SMS was originally defined as part of the GSM series of standards in 1985, codified by the Implementation of Data and Telematic Services Experts Group (IDEG, later WP4) as GSM 03.40 (point-to-point) and GSM 03.41 (cell broadcast), and expanded to include alternative mobile standards such as ANSI CDMA networks. SMS is currently maintained by the 3rd Generation Partnership Project at http://www.3gpp.org "Cell Broadcast" means: a communications protocol that allows the sending of text messages simultaneously to all mobile devices in a geographic region. Cell Broadcast is defined as part of the GSM standards, specifically GSM 03.41, and is currently maintained as specification 3GPP TS 23.041 by the 3rd Generation Partnership Project at http://www.3gpp.org.

"MMS" means a communications protocol that allows the sending among mobile telephone devices of messages that include multimedia objects such as images, audio and video, and not just text as in SMS. MMS standards are currently maintained by the 3rd Generation Partnership Project at http://www.3gpp.org.

"TCP/IP" means a computer network communications protocol standard as defined by the Network Working Group of the Internet Engineering Task Force (IETF) in RFC 1122. The standard is available on the Internet at http://tools.ietf.org/html/rfc1122.

"Wi-Fi" means the wireless networking technology defined in the IEEE 802.11 set of standards.

"Guardian" means a person having responsibility for a child who uses the method and system of an embodiment of the present invention with the intent that it assist him/her in recovering the child if a Missing Child Incident should occur.

"Responder" means a person who uses the method and system of an embodiment of the present invention with the intent to assist a Guardian in the recovery of a child after a Missing Child Incident occurs.

"User" means either a Guardian or a Responder.

"Missing Child Incident" means the separation of a Guardian from a child who has been in the Guardian's care and whose present whereabouts is unknown.

"Response Location" means the latitude and longitude of a named geographic location where the User is willing to act as a Responder if a Guardian declares the loss of a child.

"Communications Device" means an electronic device having memory, processing, display and power systems as well as one or more methods of substantial electrical communication between the device and other systems or devices. By way of example, a cellular phone such as an Apple iPhone is a communications device.

"Media Device" means an electronic device that is not dependent upon any method of continuous electrical communication between the device and other systems or devices, but which has memory, processing, display and power systems. By way of example, an Apple iPod and Apple iPhone are media devices.

"System Device Software" means that portion of the software embodying the present invention that executes on the mobile devices of the Guardian and Responder.

"System Server Software" means that portion of the software embodying the present invention that executes on system servers supporting the data base of the invention.

"Servlet" means a software component according to the Servlet specification of Java EE 5. Java Servlets embody custom functional logic that may be initiated by a remote client by transmitting a particular HTTP or HTTPS request to a server hosting the Servlet component. Java Servlets may typically be executed many times by different clients both sequentially and concurrently, with each execution of the Servlet capable of acting independently of the others to fulfill its functional logic. Such independent execution is referred to as a thread. When each Servlet thread completes its functional logic, its thread of execution on the server ends, but the server may initiate other threads of Servlet execution when subsequent requests occur. Servlets are capable of generating web pages for viewing by the client. These generated web pages can comprise the user interface for server software functionality.

"Class" means a software component providing a particular set of behaviors.

"Configuration" means a set of one or more parameters which cause a particular software behavior.

"Preferences" means a set of one or more parameters provided by the end user of software.

"Tracking" means a communication of information about the progress of a search, rescue, and recovery of a missing child.

"Coordination" means managing a search, rescue, recovery process including identifying actions to be taken, assigning parties to complete actions, facilitating communications among parties, adjusting courses of action as updates on the progress of a search, rescue, or recovery are received, and determining quality, efficiency, and completeness of actions taken.

The hardware system of an embodiment of the invention first will be described from an overview level in connection with the description of FIGS. 1 and 2. Thereafter, a more detailed description of the computer software comprising an embodiment of the invention will be made in connection with the description of FIGS. 3-22.

Referring to FIG. 1, the environment in which embodiments of the present invention operate is shown in functional block diagram form. A mobile cellular phone 1 possessed by a Guardian is shown to be in wireless communication over a wireless communications path 2 with a Responder having a mobile cellular phone 3. Cellular phone 3 is representative of numerous cellular phones that may be possessed by numerous Responders.

Cellular phones 1 and 3 also are shown to be in wireless communication, respectively by way of wireless communications paths 4 and 5, with a communications network 6.

Communications network 6 in turn is in wireless communication by way of a wireless communications path 7 with a mobile cellular phone 8. The communications network 6 also is connected by way of a communications cable 9 to system servers 10, and by way of a communications cable 11 to computers 12. It is to be understood that the communications network 6 may in the alternative exchange wireless communications with system servers 10 and computers 12.

The cellular phones 1 and 3 respectively receive by way of wireless communications paths 13 and 14 GPS information including time signals from a GPS satellite 15. The cellular phones determine their latitude and longitude from the time signals.

The cellular phone 1 possessed by the Guardian runs System Device Software in accordance with embodiments of the invention. One or more Responders have a mobile cellular phone 3 that also is running System Device Software. Concurrently, System Server Software in accordance with embodiments of the invention is running on system servers 10. Such software accommodates not only the receipt of information, but also the transmission or sharing of information.

The electromagnetic signals produced by cellular phones 1 and 3, and by communications network 6, on wireless communications paths 4 and 5 may be comprised of any of a number of communications protocols including Wi-Fi and standard cellular data communications protocols offered by cellular network service providers. Wi-Fi networks may be open or closed networks, where an open network allows systems to participate in the network without requiring private knowledge such as a password, while closed networks require systems to have private knowledge to participate, such as a password or knowledge of a private network name.

The communications network 6 may be comprised of a number of communication systems including cellular network systems, the Internet, other public and private networks, and interconnections there between.

By way of example and not limitation, the Internet 22 may provide communications network 6 with a protocol such as TCP/IP to communicate with computers 12. Further, mobile cellular phone 1 may be selected to communicate with communications network 6 by way of Wi-Fi signals on wireless communications path 4, and system servers 10 may be selected to communicate with the communications network 6 by way of TCP/IP signals on a communications cable 9. Thus, upon being converted by cellular device 1 to the TCP/IP protocol, the Guardian's data may be sent by way of signal path 4 to the Internet communications network 6, and then by way of communications cable 9 to system servers 10.

Similarly, the cellular phone 3 of a Responder may be selected to communicate with the communications network 6 by way of Wi-Fi signals on wireless communications path 5, or cellular phone 8 of a bystander may be selected to communicate by way of Wi-Fi signals on wireless communications path 7. Thus, both Responder data and bystander data may be converted to the TCP/IP protocol and respectively transmitted from cellular phone 3 and cellular phone 8 through the communications network 6 to system servers 10 for storage and later sharing among the Guardian, the Responders, and the bystanders as deemed appropriate by the Guardian.

Like expediency is realized in communicating with law enforcement, search and rescue organizations, and public media directly by way of data provided by System Server Software residing in system servers 10. Such data is transmitted over communications cable 9, through communications network 6, and along wired communications path 11 to computers 12 running standard Web browser software such as Mozilla Firefox 3.0 provided by the Mozilla Foundation on the Internet at http://www.mozilla.org/.

If either wireless communications path 4 or wireless communications path 5 should be over a cellular communications network, then the cellular network provider provides a gateway allowing communication between the cellular data network and the Internet so that the same TCP/IP communications among cellular phone 1, cellular phone 3, and system servers 10 may occur. The wireless communications path 2 between cellular phone 1 and cellular phone 3 may be provided by a Wi-Fi network to allow direct communication between the cellular phones regardless of whether either device is currently able to communicate with communications network 6.

In some embodiments, restricted communications are used to ensure the system is limited to certain participants. In other embodiments, encrypted communications are used to ensure the security of transmitted data. In still other embodiments, standard device and communications security principles are applied to produce a secure system.

A further resource that may be availed of by the System Device Software residing on both cellular phone 1 and cellular phone 3 is a geographic location system such as the Global Positioning System (GPS). Signals generated by GPS satellites 15 are transmitted along wireless communications paths 13 and 14 leading respectively to cellular phone 1 and cellular phone 3. From such signals, the System Device Software residing on the cellular phones is used to determine the geographic location of the User's cellular phone as desired. Some mobile cellular phones provide other geographic location systems, such as a triangulation-of-position system that determines locations relative to cellular radio towers at known fixed locations, or systems that recognize the presence of unique short-range radio signals known to exist only in a given geographical location.

In an embodiment of the invention, cellular phones 1 and 3 are iPhone 3G cellular phones, Model No. MB048LL, ("iPhone") operating under the iPhone OS 2.0 operating system ("iPhone OS"), each produced and offered commercially by Apple, Inc. ("Apple"). Methods for customizing the above cellular system are provided by Apple upon request to all registered iPhone developers. Of particular interest to developers of embodiments of the present invention are the documents "iPhone OS Programming Guide," "Objective-C 2.0 Programming Guide," "iPhone Application Tutorial," and "iPhone Human Interface Guidelines."

The iPhone OS offers a variety of useful capabilities, grouped by related functionality as "frameworks," in software written in the Objective-C programming language. Capabilities provided to the System Device Software by the iPhone OS, a description of the Objective-C language, sample code for capabilities which are utilized in an embodiment, and recommended methods of development for the iPhone are described in documentation readily available from Apple to any registered Apple iPhone developer including by way of example, the "iPhone OS Programming Guide". Similarly, Apple provides adequate software tools to develop the System Device Software for the iPhone, and computer hardware that is used to execute such software tools. By way of example, please refer to the "iPhone SDK" for the iPhone OS 2.0, including "Xcode 3.1," "Interface Builder," the "iPhone Simulator," and related documentation, as offered commercially by Apple, that run on a MacBook Pro laptop computer offered commercially by Apple.

The iPhone provides the ability to communicate by way of cellular communication networks of a variety of worldwide carriers such as AT&T in the United States of America and O2 in Britain. Communication on cellular networks can take the form of voice and/or data, including TCP/IP Internet communications. Also provided by the iPhone is the ability to communicate over Wi-Fi communication networks, which may provide a local-only network for connecting multiple devices to each other, or which may be connected to the Internet to provide TCP/IP Internet connectivity to the iPhone. Communications capabilities of the iPhone are provided to the System Device Software running on the iPhone OS through methods documented by Apple. By way of example, an embodiment of the present invention uses networking software components of the iPhone OS such as the "Foundation", "System Configuration", and "CFNetwork" frameworks, the "URL Loading System", and software Classes such as "SCNetworkReachability," "NSNetServices," "CFNetServices," "NSURL," "NSData," and "UIWebView" to determine and utilize communications capabilities. These components allow the System Device Software to communicate with system servers over the Internet, and to discover and communicate with other local devices.

The networking software components of the iPhone OS insulate the software developer from having to know whether the software's TCP/IP connection to servers and other devices is provided by a Wi-Fi network or over a cellular communications network. Thus, bi-directional wireless electromagnetic signals 4 and 5 may be over Wi-Fi or cellular communications networks, with equivalent resulting software functionality. Further, software components from the "UIKit" framework of the iPhone OS allow the System Device Software to provide a graphical user interface for the user to control primary system functions.

Before the occurrence of a Missing Child Incident, the Guardian will use the System Device Software on the mobile cellular phone 1 to collect identifying information of himself, of potential Responders, and of the child as more particularly described below. The information collected by the Guardian will be stored by the System Device Software on the Guardian's mobile cellular phone 1, and communicated by the System Device Software to the system servers 10 where it is stored by the System Server Software. One or more Responders will use the System Device Software on his/her mobile cellular phone 3 to collect identifying information of themselves as more particularly described below. The System Device Software on the Responder's mobile cellular phone 3 will store the collected information on the mobile cellular phone 3, and communicate the information to system servers 10 where it is stored by the System Server Software. Contact information for state and federal law enforcement, search and rescue services, publication media including radio, television, and newspaper media, and geographic locations that are generally held to present dangers to children also are stored by the System Server Software for immediate access by the system servers 10.

The identifying information of the child collected by the Guardian prior to a Missing Child Incident may include name, photographs, height, weight, age, ethnicity, identifying marks or scars, hair and eye colors, current clothing description, any idiosyncrasies of the child such as phobias or attractions to which the child is susceptible, and current location of the child.

The identifying information of the Guardian that is collected by the Guardian prior to a Missing Child Incident may include name, photographs, contact information such as cell phone number, current geographic location, maximum age of identifying information of the child after which the identifying information should be updated, and geographic locations thought by the Guardian to present dangers or relative safety to the child.

The identifying information of the Responder collected by the Responder prior to a Missing Child Incident may include name, photographs, contact information such as a cell phone number, current geographic location, and geographic locations where the Responder is likely to be able to assist in the recovery of a child.

Through use of the system of FIG. 1 including GPS satellites 15 as described earlier, the Guardian also may use System Device Software on mobile device 1 to periodically update the above pre-event data to include the Guardian and child's current location and intended destination data. In this manner, the child may be tracked, thereby allowing the proximity of the child to danger zones and safety zones to be determined. A notice is issued by the system to the Guardian to warn of danger zones where risk to the child is high, and to inform the Guardian of alternative routes through safety zones where risk to the child is low or where the number of available Responders is high if a Missing Child Incident should occur.

The System Server Software is programmed to issue update notices to the Guardian by way of communications cable 9, communications network 6, wireless communications path 4, and cellular phone 1 to remind the Guardian to update the data stored by the System Device Software on the mobile cellular phone 1 and in the system servers 10, when no update has occurred for a designated period of time. Further, the System Server Software issues warnings by way of communications cable 9, the communications network 6, and wireless communications path 4 to the cellular phone 1 when the updates to the geographic location of the cellular phone 1 indicate that the Guardian is approaching a danger zone. The System Device Software on cellular phone 1 retrieves the location of danger zones from the System Server Software to store them on the cellular phone 1 so that warnings can be provided to the Guardian even when the system servers 10 are unreachable. In the event danger zones are nearby, the cellular phone 1 reminds the Guardian to update data about the child such that recent identifying information of the child is available for use if a Missing Child Incident should occur, and the System Device Software or System Server Software produce for cellular phone 1 an alternative route through safe zones of little risk to the child. By way of example, the System Device Software determines that the Guardian is at an amusement park, and remind the Guardian to update photos of the child and descriptions of what the Guardian and child are currently wearing for use by all search participants if the child is lost while at the amusement park.

By way of the communication and software capabilities described above, at such time as a Missing Child Incident occurs, the Guardian may use the System Device Software to immediately communicate the occurrence of the Missing Child Incident, the Guardian's current geographical location, current date, current time, and identity of the missing child to the System Server Software. If the System Server Software is unreachable, the System Device Software on the Guardian's cellular phone 1 may discover Responder cellular phones 3 available on the local Wi-Fi network, and communicate the occurrence of the Missing Child Incident, identifying information of the child, and identifying information of the Guardian directly to the System Device Software running on the Responder's cellular phone 3. Such communications comprise the beginning of a search process relative to a Missing Child Incident.

When the System Server Software is notified of the Missing Child Incident, it uses the stored information about Responders to determine their availability, and their possible effectiveness as Responders who will take an active part in the search. Based on such criteria, certain Responders are selected for the search. The System Server Software then communicates by way of communications cable 9, communications network 6, and wireless communications path 5 with the System Device Software on the Responder's cellular phone 3 to enlist his/her participation in the search. Upon enlistment, the System Device Software on the Responder's cellular phone 3 receives the identifying information of the missing child so the Responder may efficiently and effectively take part in the search.

The Guardian or Responder may use the System Device Software respectively on the Guardian's cellular phone 1 or Responder cellular phone 3 to visually display the photographs of the missing child to bystanders or witnesses at the time of the Missing Child Incident. This allows the Guardian or Responder to efficiently and effectively inquire about witnessed events and to enlist the aid of such persons in the search.

At the discretion of the Guardian or Responder, information may be shared with bystanders or witnesses having a cellular phone 8 connected to the communications network 6 by way of wireless communications path 7 to access information about the Missing Child Incident, even though the cell phone may not be running System Device Software. By way of example and not limitation, such information may be a URL of a web page served by the System Server Software that provides information to assist in contributing to the search. Photographs of the child, the phone number of the Guardian, and a link to download System Device Software to the cellular phone 8 for enhanced participation may be found on the web page. Such a URL may be provided verbally, through an SMS message, or similar manner, such that the web page could be viewed by the User of cellular phone 8 on a web browser if such existed on his/her cellular phone. Also by way of example and not limitation, if the cellular phone 8 is capable of receiving SMS or MMS messages, the Guardian or Responder may use the System Device Software to send an SMS or MMS message to the cellular phone 8 that contains identifying information of the child, and provide the phone number of cellular phone 8 to the System Server Software to designate that the cellular phone should receive SMS or MMS messages containing identifying information about the child and updates about the search.

At such time as one of the Responders locates the missing child, the Responder uses the System Device Software on his/her cellular phone 3 to indicate that the child has been found. The System Device Software communicates a status update including the current geographic location of the Responder to the System Server Software, which in turn communicates the status update to the Guardian's System Device Software and to the System Device Software running on all other enlisted Responder's cellular phones 3. The System Device Software of the Guardian's cellular phone 1 retrieves the identifying information of the Responder who found the child from the System Server Software, and displays it to the Guardian. The Guardian then sees the name, photo, and map of the current location of the Responder who found the child to assist in aiding the Responder to recover the child, and requests that the System Device Software initiate a phone call to the Responder's cellular phone 3 so that arrangements may be made to return the child to the Guardian. In like manner, the identifying information of the Guardian may be retrieved from the System Server Software, and displayed by System Device Software of the cellular phone 3 of the Responder who found the child. As with the search process, the efforts of the participants in returning the found child to the Guardian may be recorded, coordinated and reported to all participants.

At such time as the Guardian recovers the missing child, the Guardian uses the System Device Software on his/her cellular phone 1 to indicate that the child has been recovered. The System Device Software communicates this status update to the System Server Software, which in turn communicates this status update to the System Device Software running on all enlisted Responder's cellular phones 3. The System Device Software of the Responder cellular phone 3 indicates to the Responders that the child has been recovered by the Guardian, and that no further search effort for the recovered child is required. This ends the Missing Child Incident process.

If the missing child is not found within a short time, the Guardian, the System Server Software, or Responders may increase the scope of the search to include more Responders. By way of example, the System Server Software upon declaration of a Missing Child Incident notifies all Responders within a radius of a 5 minute walking distance from the location of the incident. After 10 minutes pass, the System Server Software additionally notifies all Responders within a radius of 10 minutes walking distance from the location of the Missing Child Incident, and after 10 minutes pass the search may be increased in scope to include all Responders in a 40 mile radius, as well as local law enforcement and state and federal rescue services.

If at any time any participant in the search discovers any information that indicates that the missing child is in danger, the System Device Software of cellular phones 1, 3, or other user interface accessible by cellular phone 8 may be used to send such information to the System Server Software. The System Server Software then will elevate the risk status of the search effort, notify all participants in communication with communications network 6 of the change in risk status, and place the full system capabilities in accordance with embodiments of the invention under the control of the law enforcement participants.

Figure 2:
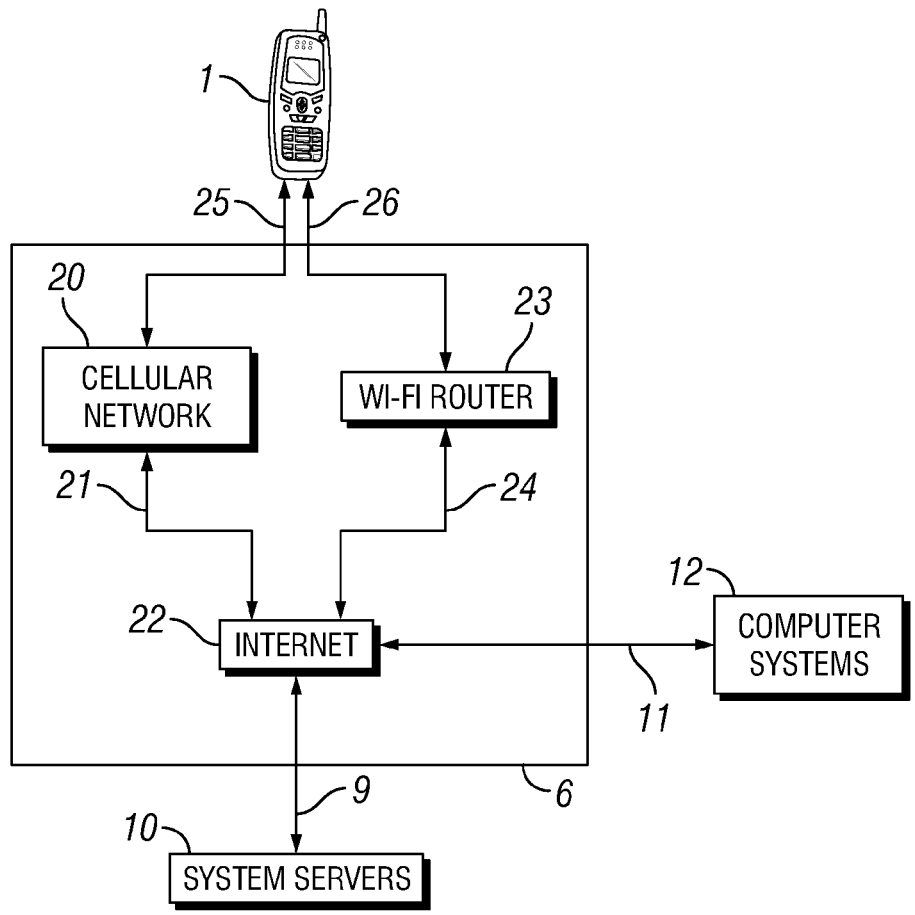
FIG. 2 is a more detailed functional block diagram of communications network 6 of FIG. 1.

As illustrated in FIG. 2, the communications network 6 of FIG. 1 is comprised of a cellular network 20, the public Internet 22, and a Wi-Fi router 23. Examples of cellular network 20 are those owned and made accessible to the public by a cellular network provider such as AT&T in the United States, Orange in France, and O2 in Britain. The cellular network provider provides a wired two-way communications path 21 between cellular network 20 and Internet 22, thus allowing mobile cellular devices connected to the cellular network to access the Internet 22. Further, a Wi-Fi router 23, such as the AirPort Extreme Base Station, Model No. MB053LL/A, made by Apple, may be connected to the Internet 22 by way of a wired two-way communications path 24.

The Internet 22 in turn is connected by way of a wired two-way communications path 9 to system servers 10, and by way of a wired two-way communications path 11 to computer systems 12.

When a mobile cellular phone, such as by way of example and not limitation mobile cellular phone 1, desires to communicate with the system servers 10, a wireless two-way communications path 25 leading from mobile cellular phone 1 to cellular network 20 is used when distances between mobile cellular phone 1 and communications network 6 exceed Wi-Fi range. In this event, communications between mobile cellular phone 1 and system servers 10 occur by way of communications path 25, cellular network 20, communications path 21, Internet 22, and communications path 9. If the distance between mobile cellular phone 1 and communications network 6 is within Wi-Fi range, a wireless communications path 26 leading to Wi-Fi router 23 is used. In this case, communications between mobile cellular phone 1 and system servers 10 occur by way of communications path 26, Wi-Fi router 23, communications path 24, the Internet 22, and communications path 9. Communications paths 25 and 26 collectively represent wireless communications path 4 of FIG. 1.

Communications between mobile cellular phone 1 and computer systems 12 are similarly achieved by substituting communications path 11 for communications path 9 in the above description.

A detailed description of the System Device Software in accordance with embodiments of the invention follows with reference to FIGS. 3 through 16.

An embodiment of a System Device Software for the Guardian and Responder iPhones, cellular phones 1 and 3 of FIG. 1, is embodied in one software application that performs both Guardian and Responder functions. In this way a single individual interacts with the System Device Software as Guardian for purposes related to his/her children, and as Responder for purposes related to the children of other Guardians.

User interface functions are grouped into three inter-related categories: "Account", "Missing", and "Searches". A Guardian uses the "Missing" function to declare one or more of his/her children as missing, and then uses the "Searches" function to aid in the recovery of the child and declare to the system when the child has been recovered. A Responder uses the "Searches" function to aid in his/her search for other people's missing children, and to declare to the system when he/she has found a child. Both Guardian and Responder use the "Account" function to establish and maintain preferences regarding his/her preferred behavior of the system such as the Responder indicating locations in which he/she wishes to be notified of missing children, and the Guardian indicating the frequency of update reminders regarding identifying information about themselves and the children.

Figure 3:
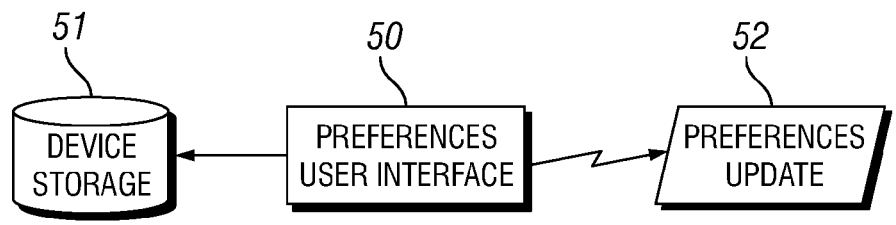
FIG. 3 is a flow diagram of the Account function of the System Device Software of an embodiment of the present invention.

Referring to FIG. 3, a functional block diagram of the System Device Software for the "Account" function for any User's iPhone is illustrated. After installation of the System Device Software as distributed by the App Store of Apple, Inc., the User will input usage preferences through the user interface 50. The User and each child identified through preference inputs is assigned a universally unique identifier (UUID) that is generated by the System Device Software using the CFUUID Class of the Core Foundation framework. The UUID is subsequently used in the System Device Software and System Server Software to guarantee the personal identification of the User or child.

Preferences created at the user interface 50 include the User's name, User's UUID, the cell phone number of the User, and a photograph of the User. If the User is a Guardian, preferences will also include the name of each child of the Guardian, the UUID of each child, descriptive text about each child, recent photographs of each child, and a time period for notification to update photos of the children. If the User is a Responder, preferences created at the user interface 50 will also include Response Locations.

The above preferences are stored by the System Device Software in a local device storage 51 of the iPhone according to the standard coding practices detailed in the "Application Preferences" section of the "iPhone OS Programming Guide". This section of the guide also details how to retrieve the preferences from storage for use elsewhere in an invention embodiment. Upon initial input or any update of preferences, the preferences are not only stored in device storage 51, but are also sent by the System Device Software to the System Server Software on system servers 10 of FIG. 1 in the form of a Preferences Update 52 of FIG. 3. The message is submitted as a secure, authenticated HTTPS POST to the System Server Software. HTTPS transmissions from System Device Software are created by using the Core Foundation framework according to standard coding practices detailed in the "CFNetwork Programming Guide", "CFNetwork Framework Reference", the "Secure Communication" section of "Security Overview", and "Core Foundation URL Access Utilities Reference" as provided commercially by Apple, Inc.

When the User has entered preferences through use of the user interface 50 of FIG. 3, and the System Device Software has stored the preferences locally in device storage 51, and communicated them to the System Server Software, the software flow for establishing preferences is complete. Thereafter, the User may modify preferences at any time.

Figure 4:
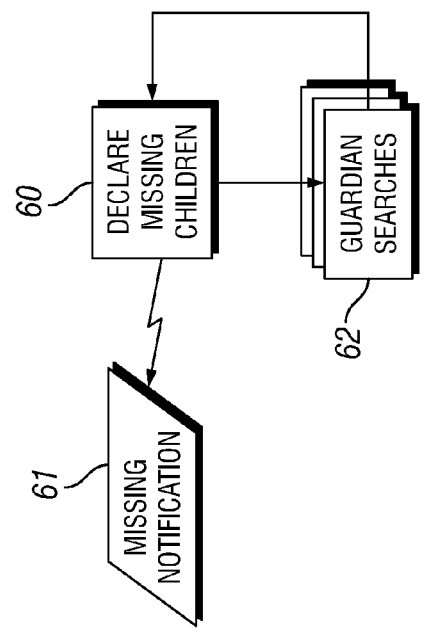
FIG. 4 is a flow diagram overview for the Guardian's use of the Missing and Searches functions of the System Device Software.

Referring to FIG. 4, a logic flow diagram of the System Device Software in a Guardian's iPhone upon loss of a child is illustrated. Declaration of the missing child is made through a Guardian input at logic step 60. When the Guardian declares the loss, the System Device Software sends a Missing Notification message at logic step 61 to the System Server Software in the same HTTPS format previously described above for Preferences Update messages. The Missing Notification message contains the Guardian's current location as latitude and longitude values, the date and time of the declaration, the UUID of the Guardian, and the UUID of each child who is declared missing. Location of the Guardian is determined by using the Core Location framework according to the programming practices detailed in the section "Getting the User's Current Location" of the "iPhone OS Programming Guide." Current date and time is determined using the NSDate Class of the iPhone OS. The UUIDs are retrieved from the preferences stored in device storage 51 of FIG. 3.

Declaration of the missing child also causes the System Device Software to initiate a Guardian Search at logic step 62 of FIG. 4. One instance of a Guardian Search is executed for each child declared missing. While Guardian Searches are executing for a number of declared missing children, the Guardian may input new declarations in the user interface at logic step 60 for any additional child that becomes lost. When the Guardian Search processes end, the System Device Software logic flow returns from logic step 62 to logic step 60 where it awaits future missing child declarations.

Figure 5:
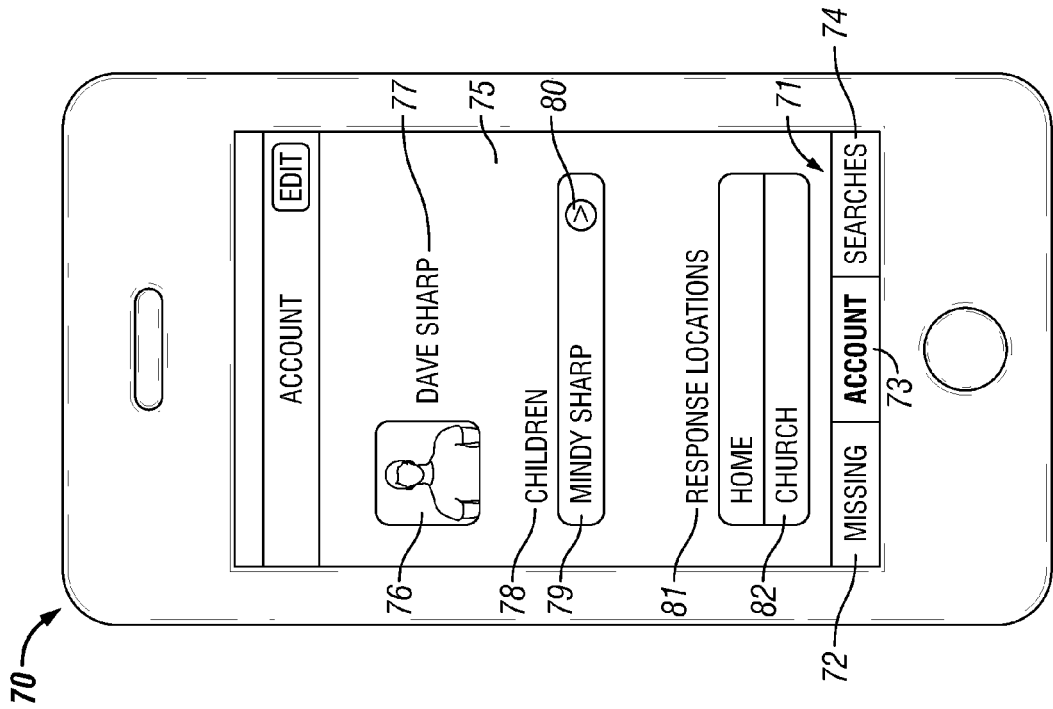
FIG. 5 depicts the upper portions of the primary Account user interface of the System Device Software.

FIGS. 5, 6, 7, and 8 are graphic representations of the user interface displayed by System Device Software to a User in the process of inputting preferences as discussed relative to functional block 50 of FIG. 3. Referring to FIG. 5, an iPhone 70 is shown with the System Device Software installed and running. A UITabBar 71 is shown with a Missing command button 72, an Account command button 73, and a Searches command button 74. The Account command button 73 is highlighted to denote selection of the Account function of the system software. The UITabBar 71 allows the User to select among the three indicated functions of the application software in accordance with embodiments of the invention. Image 75 is the UITableView that displays groups of user interface controls for establishing preferences, or for navigating to other preference screens. Image 75 can be scrolled up and down by the User's finger to display more controls than can fit in the display at one time.

At the top of the image 75 are image 76 and image 77 that comprise the UITableView header. Image 77 shows a UILabel displaying the name of the User, and image 76 is a UIButton displaying a photo of the User. Tapping by finger on the image 76 brings up an ABPeoplePickerNavigationController, as described in the Address Book Programming Guide for iPhone OS, that allows the User to select his own Address Book record from the iPhone's Address Book contacts list. The User further may select his own iPhone cell phone number from that Address Book record. When the selection is made, the System Device Software creates a UUID for the User, and stores the UUID, the record identifier ABRecordRef of the selected address book record, the User's photo from the selected address book record, the User's cell phone number from the selected address book record, and the User's name from the selected address book record, into device storage 51 of FIG. 3 and sends the stored information to the System Server Software as described in connection with the description of FIG. 3. When the User is finished selecting from the Address Book, he/she is returned to the screen depicted in FIG. 5.

Image 78 of FIG. 5 is the title for the section of the UITableView displaying the list of children a Guardian has configured by storing a list of children with accompanying identifying data into the children's preferences data. Image 79 is a UITableViewCell that displays a child's name. If multiple children have been configured by the Guardian, multiple UITableViewCells, each displaying a child's name, will be displayed. Tapping on image 79 with a finger causes the System Device Software to display the iPhone's camera interface using the UIImagePickerController as described in the section "Taking Pictures With The Camera" of the iPhone OS Programming Guide. Any new photo taken by the User is associated with the child displayed in the tapped row, and stored as that child's photo in device storage 51 of FIG. 3. The photo then is sent to the System Server Software as described in connection with the description of FIG. 3 above. When done with the camera interface, the User is returned to the screen depicted in FIG. 5.

Image 80 is a UITableViewCellAccessoryDetailDisclosureButton. When the image is tapped on a given row, the System Device Software uses the ABPersonViewController to bring up a view showing the details of an Address Book record for the child as stored in device storage 51 of FIG. 3. The ABPersonViewController and Address Book functionality is detailed in the ABPerson Reference and Address Book Programming Guide for iPhone OS as offered commercially by Apple. The Boolean value "allowsEditing" of the ABPersonViewController is set by the System Device Software to YES, and the appropriate constants such as kABPersonFirstNameProperty, kABPersonLastNameProperty, and kABPersonNoteProperty are entered by the System Device Software in the array of "displayedProperties" of the ABPersonViewController to cause display of the child's first name, last name, and note from the child's Address Book record. The Guardian then may edit the name as well as the note associated with the child. Note information entered here is intended to be descriptive identifying information of the child, and will be provided to Responders during their search for the child. When the edit is complete, the Guardian presses the "Done" button on the ABPersonViewController and the Address Book information is stored in device storage 51 of FIG. 3 and sent to the System Server Software as described in connection with the description of FIG. 3. The Guardian is then returned to the screen depicted in FIG. 5.

Image 81 is the title for the UITableView display of the list of Response Locations a Responder has configured by storing the location of potential responses in their preferences data. Image 82 is a UITableViewCell that displays a configured Response Location name. Tapping by finger on image 82 causes the iPhone 70 to display the iPhone's Maps application with the selected location in the center of the map. This is performed by the System Device Software in accordance with the guidance offered by the "Apple Applications URL Schemes" and "Map Links" sections of the iPhone OS Programming Guide, using the latitude and longitude coordinates stored in device storage 51 of FIG. 3 for the selected Response Location.

Figure 6:
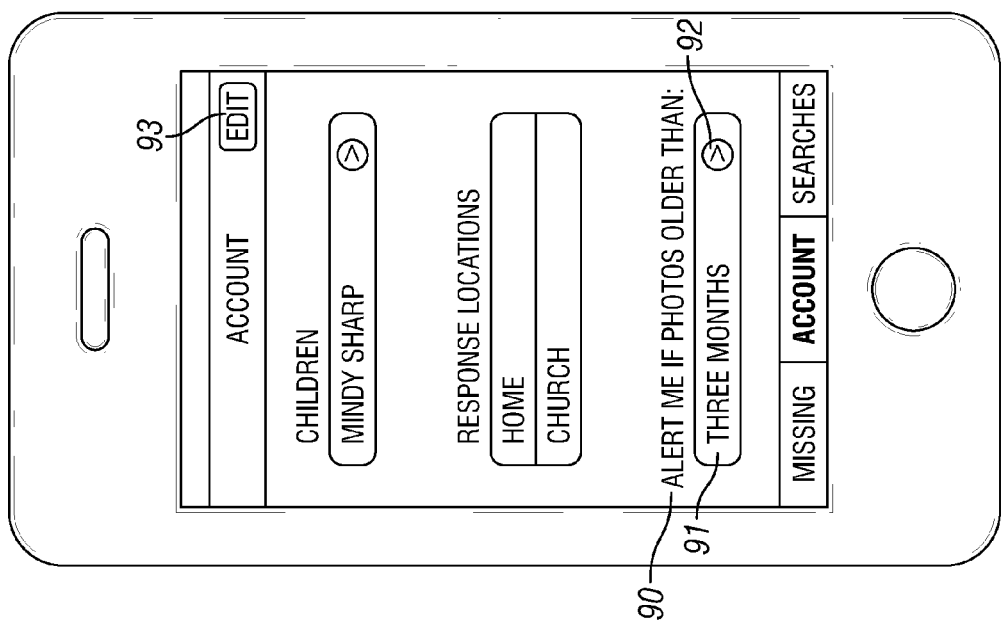
FIG. 6 depicts the lower portions of the primary Account user interface of the System Device Software.

FIG. 6 shows the UITableView 75 Account preferences display of FIG. 5 after scrolling by the User's finger to display preferences that were not previously visible. Image 90 of FIG. 6 is the title for the section in the UITableView which displays the preference setting for a System Server Software notification that the age of stored photos exceeds a designated time period. Image is a display of the designated time period. Image 92 is a UITableViewCellAccessoryDisclosureIndicator that indicates that when image 91 is tapped by the User's finger, an additional preference view will appear. Tapping image 91 causes a UIView display containing a "Save" button, a "Cancel" button, and an UIPickerView containing the options "Never", "One Day", "One Week", "One Month", "Three Months", and "One Year". If the User exercises an option in the UIPickerView and presses Save, the display is returned to that in FIG. 6, and a new reminder setting is stored into device storage 51 of FIG. 3 and sent to the System Server Software as described in connection with the description of FIG. 3. If the User presses the "Cancel" button of the UIPickerView, the iPhone display returns to that of FIG. 6 with no new preference being stored.

The image 93 is a UIViewController "editButtonitem" as described in the UIViewController Class Reference offered commercially by Apple. This button toggles the UITableView in and out of an editing state. In FIG. 6, the word "Edit" is shown because the UITableView currently is not in an editing state. Pressing the image 93 button starts the display edit state.

Figure 7:
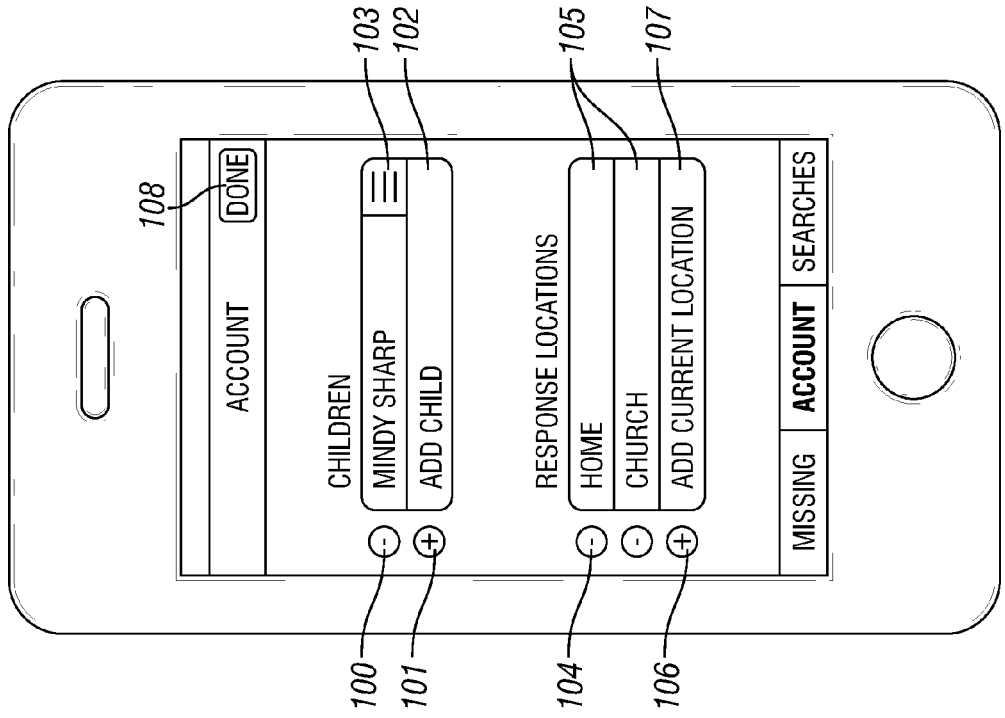
FIG. 7 depicts edit mode for portions of the primary Account user interface of the System Device Software.

Referring to FIG. 7, the UIViewController's "editButtonitem" image 93 displays the word "Done" to indicate that the display is in an editing state. The coding methods required for the System Device Software to provide the features of the editing state described below are documented in the View Controller Programming Guide for iPhone OS and Table View Programming Guide for iPhone OS offered commercially by Apple.

When in the editing state, the preferences screen displays a delete button 100 next to each configured child name, an add button 101 next to a placeholder row 102 labeled "Add child", a reordering handle 103 next to each configured child's name for using the User's finger to reorder the child list, delete buttons 104 next to each configured Response Location 105, and an add button 106 next to a placeholder row 107 labeled "Add current location".

Delete button 100 removes the associated child from the displayed child list, removes the deleted child from device storage 51 of FIG. 3, and sends a preferences update regarding the deletion to the System Server Software as discussed in connection with the description of FIG. 3. Delete buttons 104 of FIG. 7 remove the associated Response Location from the Response Location List, remove the Response Location from device storage 51 of FIG. 3, and cause a preferences update regarding the deletion to be sent to the System Server Software as discussed in the description of FIG. 3.

When the Guardian presses add button 101, the System Device Software creates a new ABPersonRef person record using ABPersonCreateQ, and displays the newly created ABPersonRef in an ABPersonViewController as described in the discussion of FIG. 5, so that the Guardian may enter and save identifying information about the newly added child. When the Guardian presses the "Done" button described in connection with the description of FIG. 5, the System Device Software creates a UUID for the child that is stored with the new person record for the child in preferences as described in the discussion of FIG. 3, the new child is added to the child list, and the iPhone display is returned to that of FIG. 7.

Figure 8:
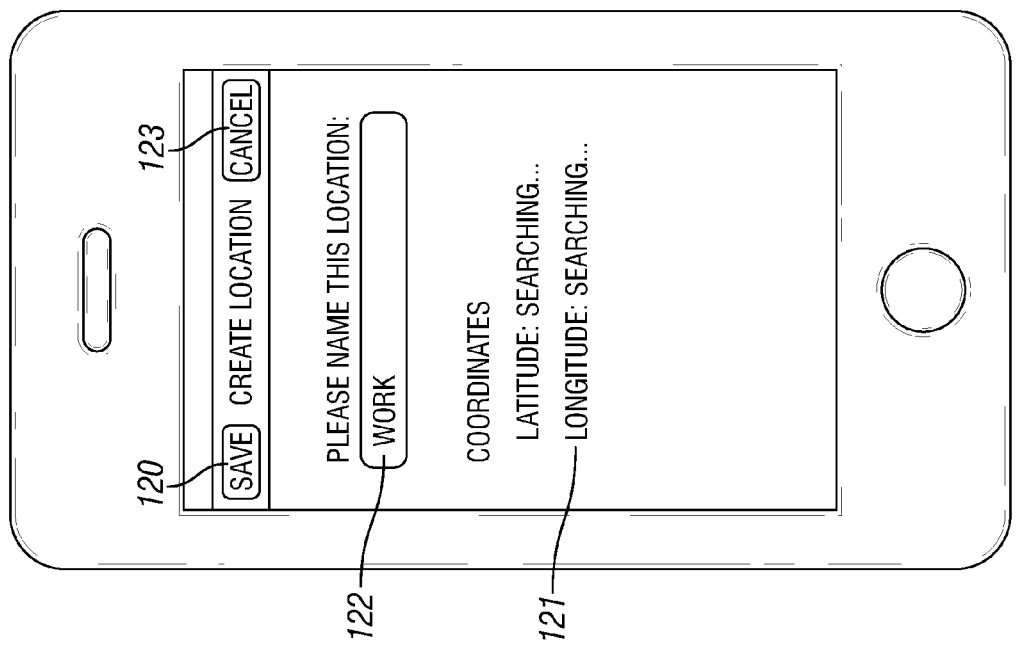
FIG. 8 depicts creating a Response Location with the Account user interface of the System Device Software.

Referring again to FIG. 7, when a Responder presses add button 106, the System Device Software provides the display of FIG. 8, which is a UIView for creating a new Response Location. When the view appears, the "Save" button 120 is disabled, and the System Device Software immediately begins the process of determining the Responder's current latitude and longitude, as described in the section "Getting the User's Current Location" of the iPhone OS Programming Guide offered commercially by Apple. When the location is determined, the latitude and longitude values are displayed by the UILabels 121.

The display window 122 of FIG. 8 is a UITextField that allows a Responder to type a name for the Responder's current location as it will be stored in a Response Location List. Tapping by finger on display window 122 causes the iPhone to display a keyboard for typing text as discussed in the "Text Field" section of Application Controls of the iPhone Human Interface Guidelines as provided commercially by Apple. Once the location is determined and a name is typed for display in display window 122, the "Save" button 120 is enabled. When the Responder presses the Save button 120, the System Device Software displays the new Response Location in the Response Location List of FIG. 7, and stores the new Response Location, including the name of the location and its latitude and longitude, in preferences as described in the discussion of FIG. 3. The view of FIG. 8 then is closed and the screen is returned to the display of FIG. 7. When the Cancel button 123 instead of Save button 120 is pressed, the view of FIG. 8 is closed, and the System Device Software returns to the display of FIG. 7.

By pressing the Done button 93 of FIG. 7, the UITableView exits the editing state and returns the display to that shown in FIGS. 5 and 6.

Figure 9:
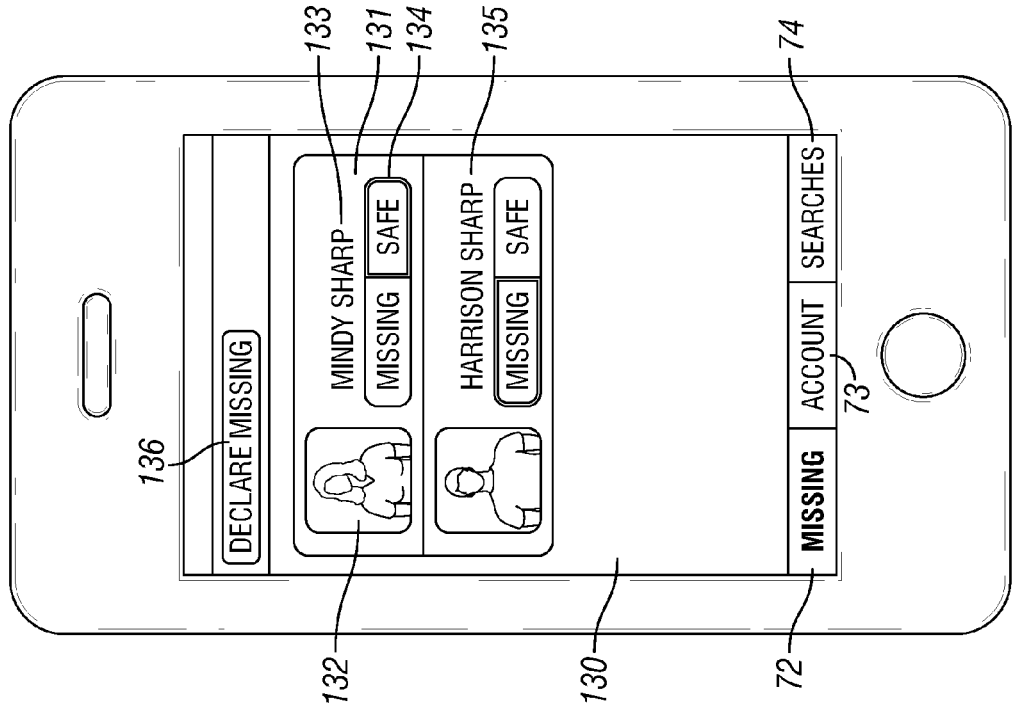
FIG. 9 depicts the user interface for the Missing function of the System Device Software.

Referring to FIG. 9, a display is shown that is provided by the System Device Software when the Missing command button 72 of FIG. 5 is tapped by the User's finger to engage the Missing function process of the System Device Software. The display of FIG. 9 is used by a Guardian to declare when he/she has experienced a Missing Child Incident regarding one or more children. The Missing command button 72 is shown highlighted to denote that the Missing function of the System Device Software has been selected to navigate the user interface to the Missing function process.

Image 130 of FIG. 9 is a UITableView that displays one UITableViewCell 131 for each child configured in the Guardian's preferences. The UITableViewCell 131 is comprised of a UIImageView 132 showing the most recent photo of the child, a UILabel 133 showing the name of the child, and a UISegmentedControl image 134 that may be toggled between a "Safe" state and a "Missing" state. If more children are configured than will fit on one screen, the UITableView image 130 is scrolled up and down by the User's finger to display UITableViewCells such as UITableViewCell 135 for the remaining children.

As before stated, the UISegmentedControl 134 toggles between two selectable states for each child: "Safe" and "Missing". To declare one or more children as missing, the Guardian toggles the corresponding UISegmentedControl to "Missing," and then taps the Declare Missing button 136. When this occurs, the System Device Software leaves the Missing function process and switches to the Searches function process. Thereupon, the System Device Software produces the iPhone display shown in FIG. 10A.

Referring to FIG. 10A, an iPhone display screen 140 is presented by the System Device Software when a Guardian search occurs. An image 141 is a nearly full-screen UIImageView of the most recent photo of the missing child. Image 142 is a UILabel showing the name of the missing child. Image 143 is a UIButton that the Guardian taps by finger to declare that the missing child has been recovered.

Images 141, 142, 143, and 144 are subviews of the UIScrollView display screen 140 that facilitates using the same display area for multiple missing children by allowing the user to scroll through multiple pages of information, one page for each missing child search. If searches are underway for multiple missing children, a UIPageControl 145 will display a row of dots with one dot for each search, and with the highlighted dot indicating the search that currently has its information displayed on screen. A User can flip through the different searches in the UIScrollView by tapping the UIPageControl 145 or by swiping his/her finger left or right across the image 141. Details on the UIScrollView and UIPageControl are provided in the "UIScrollView Class Reference" and the "PageControl" sample application, as offered commercially by Apple.

When Image 144 is tapped by the User, the image 141 is overlaid with a new image containing information about the missing child as will be explained in more detail below.

Referring to FIG. 10B, when the image 144 of FIG. 10A is tapped, a UIView image 150 as shown on iPhone 70 of FIG. 10B is presented. Image 150 contains an UIButton image 151 and a UITextView image 152. UITextView image 152 contains the identifying information of the child from the Guardian's preferences that the Guardian entered in the note field of the child record, as discussed in connection with the descriptions of FIGS. 5, 6 and 7 above.

By tapping image 151, the User causes the System Device Software to display, by way of the Maps application included on the iPhone by Apple, the location of the Guardian at the time the declaration of a missing child occurred. This is achieved by using the iPhone applications URL schemes as discussed earlier, together with the latitude and longitude determined by the System Device Software when the Guardian declared the missing child as discussed in connection with the description of FIG. 4.

The iPhone images of FIGS. 10A and 10B for the Guardian are visually identical to the iPhone images shown to a Responder in a Responder Search process. As discussed earlier, an embodiment actually performs both Guardian and Responder functions with the same software system. The image 141 of the child and identifying information of the child displayed in UIView image 150 contribute to an efficient and effective search by the Responder.

Figure 11:
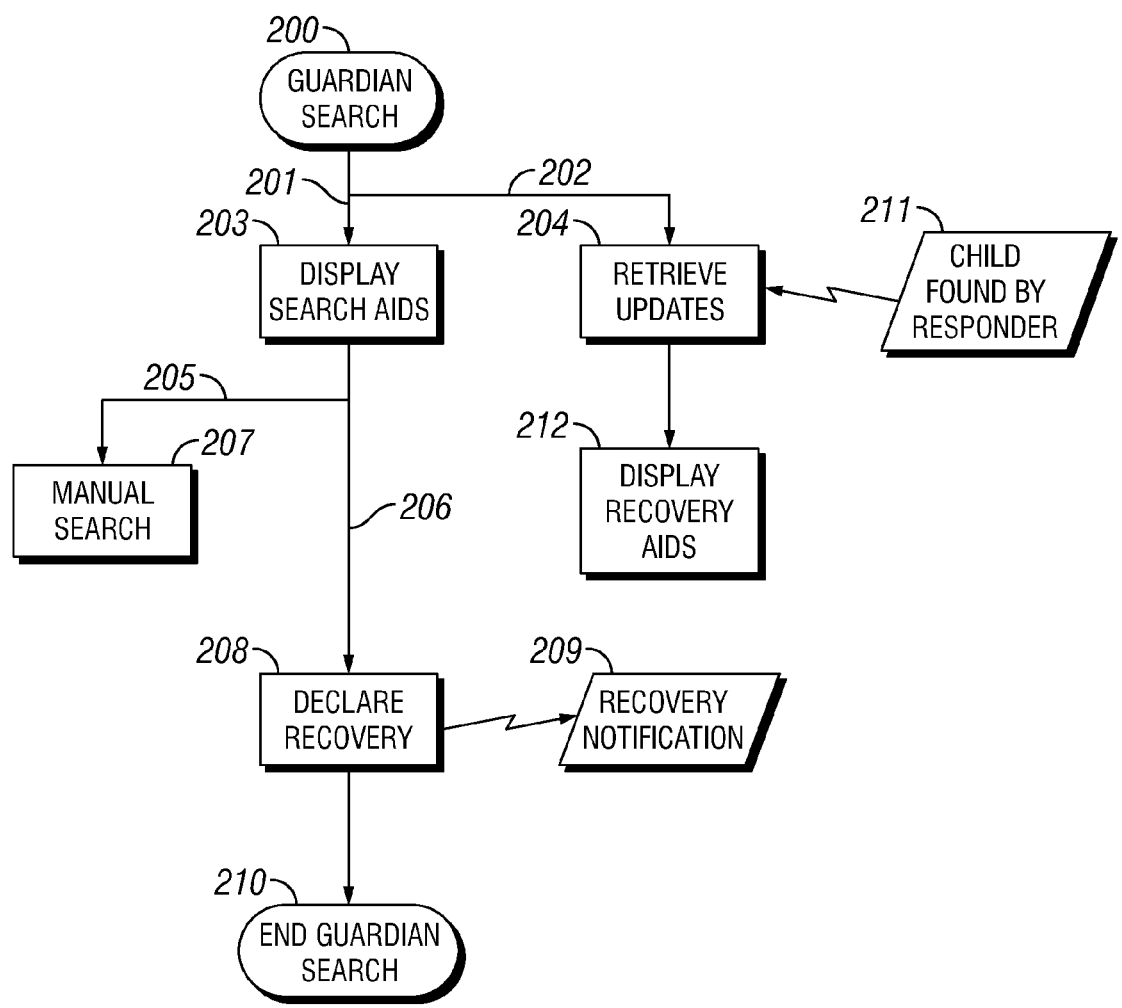
FIG. 11 is a flow diagram of the Guardian search for children function of the System Device Software.

Referring to FIG. 11, the Guardian Search process that is executed once for each declaration of a missing child is illustrated. The process is initialized at logic step 200, from which the System Device Software flow proceeds along concurrent flow paths 201 and 202 respectively to a display screen functional block 203 and a Retrieve Updates functional block 204.

The functional block 203 causes display of search aids including the name of the missing child, the most recent photograph of the child, and other details about the child as previously entered in the Guardian preferences. The functional block 203 also includes a UIButton "Found" button that when tapped indicates to the System Device Software that the child has been recovered by the Guardian. The search aids displayed by functional block 203 are those of FIGS. 10A and 10B.

From functional block 203, the System Device Software continues along concurrent flow paths 205 and 206 respectively to a Manual Search functional block 207 and a Declare Recovery functional block 208. At functional block 208, the System Device Software waits for the Guardian to declare that the child has been recovered. In the meanwhile, the Guardian iPhone continues to display the search aids of functional block 203, including a photo of the missing child so that the Guardian may show the photo to bystanders who want to assist in the search. The Guardian also begins a manual search for the child at functional block 207. At such time as the Guardian locates and recovers the child, the manual search of functional block 207 is ended, and the recovery of the child is declared by pressing the Found button displayed at functional block 203. The System Device Software thereupon sends a RecoveryNotification message 209 to the System Server Software. The Recovery Notification message contains the UUIDs of the Guardian and of the recovered child. The System Device Software also proceeds from functional block 208 of FIG. 11 to functional block 210 where the Guardian search process is ended, and the search aids for the child are removed from the display of functional block 203. Further, the Retrieve Updates functional block 204 ceases to process any messages regarding the child.

As discussed earlier, the System Server Software was notified of the occurrence of a Missing Child Incident by the Missing Notification message of FIG. 4. During the period that the Guardian is searching for the missing child, the System Server Software may have enlisted one or more Responders to assist in the search. The processes of enlistment and the Responder search are described in more detail below. If a Responder declares to the System Device Software on the Responder's iPhone that the missing child has been found, the System Device Software on the Guardian's iPhone causes the message "Found By Responder" to be displayed on the display of functional block 203.

The functional block 204 retrieves update messages from the System Server Software, and takes appropriate action in the System Device Software of the iPhone as a result. The logical flow of the Retrieve Updates sub-process of functional block 204 is described in more detail later in the discussion of FIG. 14. In the context of the Guardian Search process of FIG. 11, functional block 204 checks for occurrences of the update message "Child Found By Responder" from functional block 211. A description of the creation of the message "Child Found By Responder" by the System Server Software is found below in the description of FIG. 20. If the message is received by functional block 204 of FIG. 11, the System Device Software proceeds to functional block 212 where the Guardian is notified on the iPhone display that a Responder has located the child. The System Device Software also issues a command for an audible alert and vibration of the iPhone to occur as described in the section "Using Sound in iPhone OS" of the iPhone OS Programming Guide.

The received message from functional block 211 contains the UUID of the Responder who found the child, which is used at functional block 212 by the System Device Software of the Guardian to retrieve the identifying information of the Responder from the System Server Software. The identifying information of the Responder is retrieved from the System Server Software by way of an HTTPS GET request to a URL such as:

https://childcare.socialmobility.net/userdetails?UUID=67853B44-4E6A-1226-9D60-0050F4D00067, where the UUID is that of the Responder, and childcare.socialmobility.net is a reference to the system servers 10 of FIG. 1. The HTTPS GET request is handled by the System Server Software as described in connection with the description of FIG. 20 below, which results in the transmission of the identifying information of the Responder to the System Device Software of the Guardian. The identifying information of the Responder is displayed to the Guardian to assist the Guardian in recovering the child from the Responder, as will be described in more detail below. When the Guardian recovers the child from the Responder, the Guardian proceeds with a declaration of recovery at functional block 208 as before described.

Figure 12:
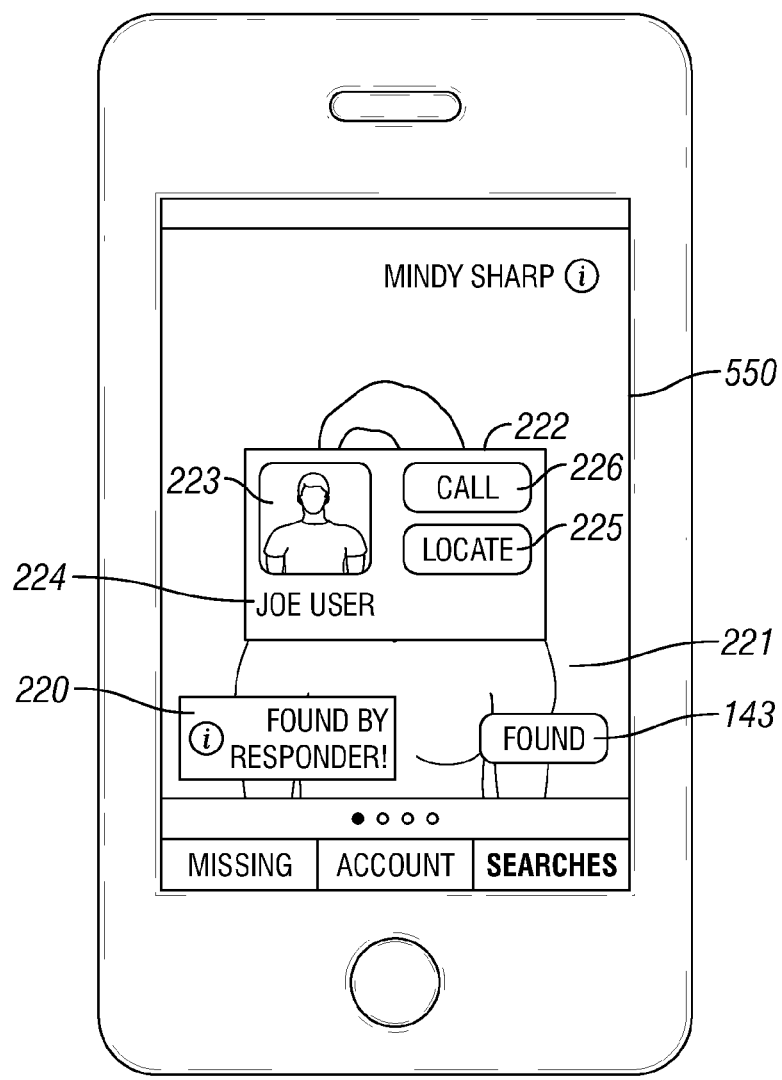
FIG. 12 depicts the display of recovery aids in the Searches user interface of the System Device Software.

Referring to FIG. 12, the Guardian's iPhone display resulting from the "Display Recovery Aids" functional block 212 of FIG. 11 is shown. When the Guardian receives the above message from functional block 211, the System Device Software causes the display shown in FIG. 12 to appear on the Guardian iPhone.

Image 220 is a UIView displayed prominently over a portion of the image 141 of the child. The image 220 includes a UILabel whose text declares that the child has been found by a Responder. The image 220 also includes a UIButton that when tapped toggles the visibility of the UIScrollView image 222 that is initially visible. The UIButton image 143 is used to declare that the Guardian has recovered the child, and is not obscured by image 222.

Image 222 includes four elements for each Responder that declares that he/she has found the child. Image 223 is a photo of the Responder. Image 224 is the name of the Responder. Image 225 is a UIButton that when tapped causes the System Device Software to use the previously described Maps application on the iPhone, to display the location where the Responder made the declaration of finding the child. Image 226 is a UIButton that when tapped causes the iPhone to place a phone call to the Responder's cell phone number. The code for causing the iPhone to place a phone call is described in the sections "Phone Links" and "Apple Applications URL Schemes" of the iPhone OS Programming Guide offered commercially by Apple.

If more than one Responder has declared that they have found the child, the UIScrollView image 222 can be scrolled up and down using the User's finger to display the user interface elements corresponding to each Responder.

Figure 13:
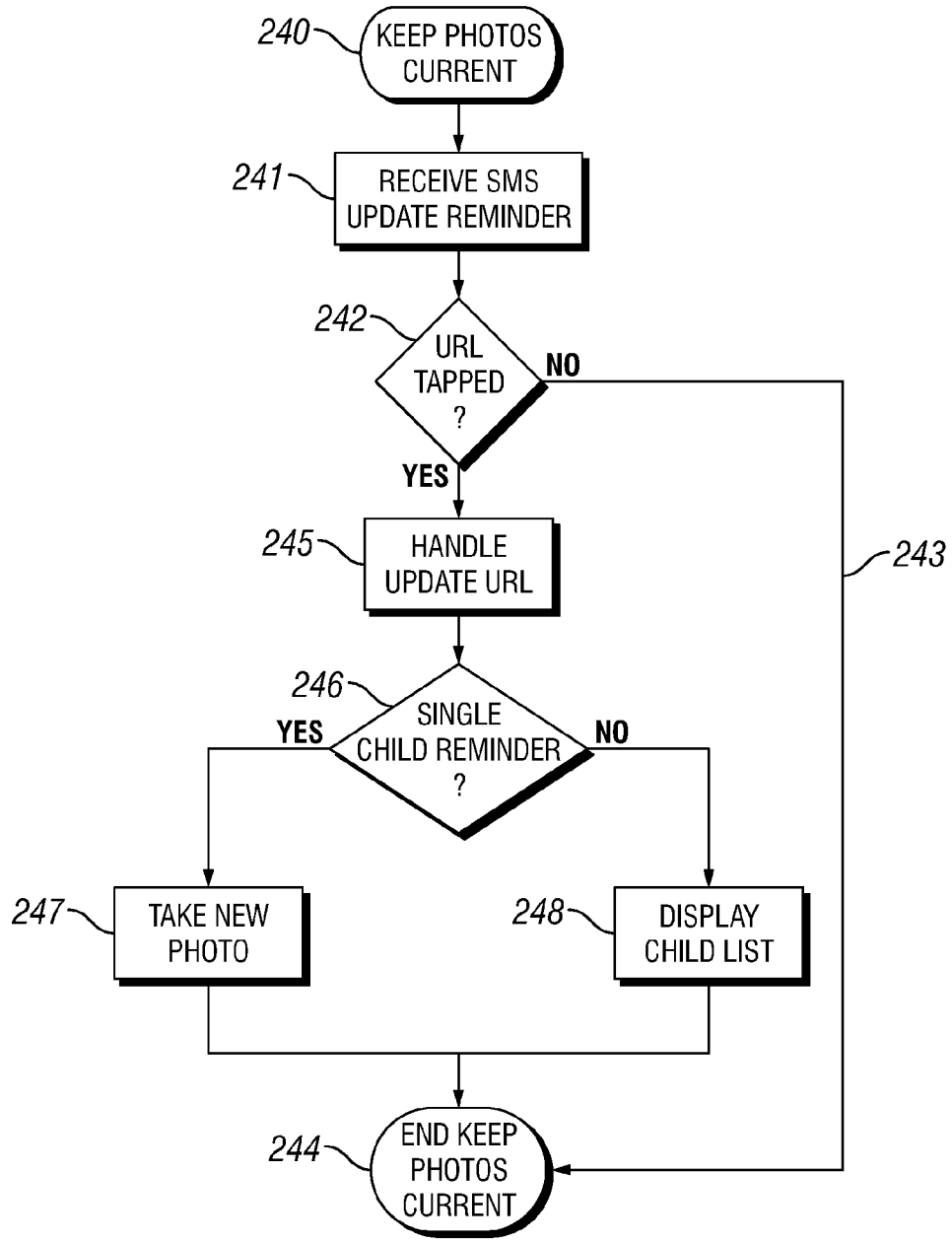
FIG. 13 is a flow diagram of the System Device Software function to remind a Guardian to update photos.

Referring to FIG. 13, the System Device Software process is illustrated for notifying the Guardian that photographs of children need to be updated periodically. As will be described in more detail below in the discussion of FIG. 21, the System Server Software periodically initiates this process by sending an SMS message to the iPhone, if preferences established as described in the discussion of FIG. 3 indicate that the Guardian desires to be periodically reminded to update photographs. Referring again to FIG. 13, the process of the System Device Software is initiated at a logic step 240 from which the logical flow proceeds to a functional block 241. At functional block 241, the standard SMS capability provided by the iPhone OS receives and displays to the Guardian the SMS message that originated from the System Server Software. The SMS message reads "Tap The Following URL To Update Your Child's Photos:" followed by a custom URL to be tapped by the Guardian's finger. The logical flow proceeds from functional block 241 to a logic step 242 where a determination is made whether the Guardian has clicked or tapped the URL. If not, the logical flow branches from logic step 242 and along a flow path 243 to a functional block 244 to end the photo update process.

The custom URL in the above SMS message takes a form similar to one of the two following examples, depending upon whether a single photo or multiple photos require update: updatephotos://arbitrarydomainname.com?UUID=67853B44-4E6A-1226-9D60-0050F4D00067, or, updatephotos://arbitrarydomainname.com, where the UUID indicated in the first example is that of a single child whose photo should be updated, and the lack of a specified UUID in the second example indicates a general reminder to update multiple photos. The URL has a custom scheme, "updatephotos://" instead of "http://".

To allow the iPhone with System Device Software installed to recognize this custom URL scheme, and notify the System Device Software if the custom URL provided in the SMS message is tapped, a developer of the System Device Software must cause the registration of the "updatephotos" URL scheme with the iPhone OS to occur when the System Device Software is installed by following the configuration steps outlined in "Registering Custom URL Schemes" of the "Application Configuration" section of the iPhone OS Programming Guide offered commercially by Apple.

When the developer has taken the above steps, and the Guardian has tapped the custom URL, the logic flow will proceed from logic step 242 to a functional block 245. At logic step 245, the iPhone OS recognizes the custom URL and sends it to the System Device Software's UIApplicationDelegate as defined in "Custom URL Schemes and Interapplication Communication" of the "Application Configuration" section of the iPhone OS Programming Guide as offered commercially by Apple. Following the coding practice and sample code provided in "Handling URL Requests" in the above section allows the System Device Software to receive the custom URL at functional block 245. Thereafter, the logic flow proceeds to functional block 246.

At functional block 246, the System Device Software determines whether the custom URL indicates the need for updating a single child's photo, or is a general reminder to update multiple child photos. For a single child photo, the System Device Software flow continues from logic step 246 to a functional block 247 to initiate the taking and storage of an updated photo for the indicated child. Thereafter, the process is ended at functional block 244.

If the custom URL indicates a general reminder for multiple children at logic step 246, the System Device Software will continue to a functional block 248 where a list of the Guardian's configured children is displayed and each listed child's photo may be updated. Thereafter, the System Device Software flow proceeds from functional block 248 to functional block 244 to end the photo update process.

Functional blocks 247 and 248 allow the update of child photos by initiating the user interface functional block 50 discussed in connection with the description of FIG. 3 above, except that upon entering functional block 50 a specific preference screen is displayed to save the User the time of manually navigating through the preferences user interface. The System Device Software performs the navigation through the preferences User interface on behalf of the User as described in "Programmatically Selecting and Scrolling" of the "Managing Selections" section of the Table View Programming Guide for iPhone OS as commercially offered by Apple.

Functional block 248 of FIG. 13 begins the user interface process 50 of FIG. 3 with the display of the child list shown in FIG. 5, so that the Guardian can quickly update the photos of one or more children. Functional block 247 of FIG. 13 begins the user interface process 50 of FIG. 3 with the display of the screen for updating the photograph of a particular child, also as described in the discussion of FIG. 5.

Figure 14:
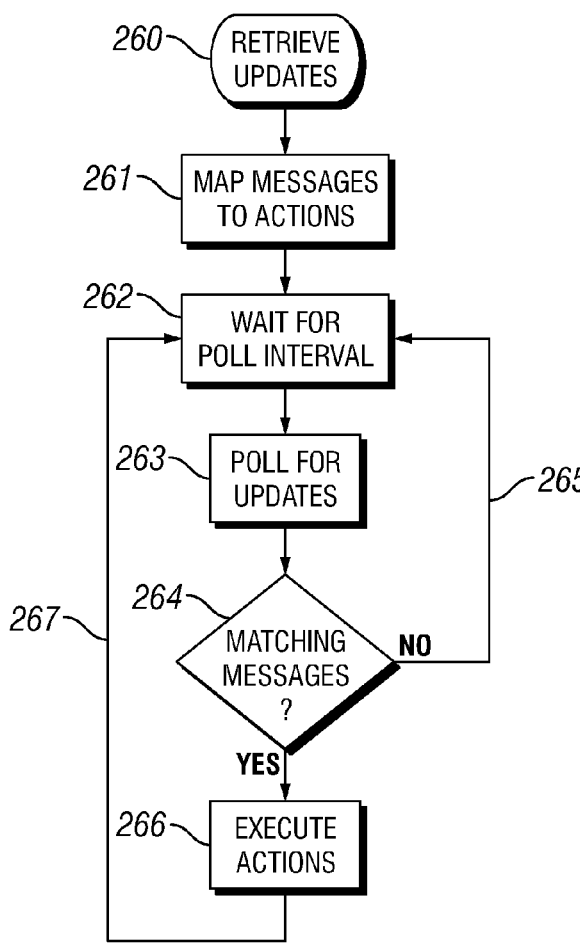
FIG. 14 is a flow diagram of the System Device Software function to retrieve and act on messages from the System Server Software.

Referring to FIG. 14, the logic flow of the System Device Software for the Retrieve Updates process that retrieves messages from the System Server Software is illustrated.

The Retrieve Updates process is initialized by entering functional block 260 from which the System Device Software continues to functional block 261 where messages from the System Server Software are associated with actions to be executed in the System Device Software on the iPhone. Once this association is established, the System Device Software flow continues to functional block 262, where the System Device Software waits for a pre-defined period of time called the polling interval. When the polling interval has expired, the System Device Software flow continues from functional block 262 to functional block 263 where an HTTPS GET request is made to the System Server Software of system servers 10 of FIG. 1 to retrieve any Incident update messages waiting for the User. The HTTPS GET request would retrieve the contents at a URL such as:

https://childcare.socialmobility.net/messages?UUID=67853B44-4E6A-1226-9D60-0050F4D00067, where the UUID is that of the User. Using that UUID, the System Server Software determines whether messages are waiting for the User, and if so, transmits them to the System Device Software in the response to the HTTPS GET. The HTTPS GET request is handled by the System Server Software as later described below.

From functional block 263 of FIG. 14, the System Device Software flow proceeds to logic step 264 to determine whether any messages matching those mapped to System Device Software actions in functional block 261 are currently present. If no match is detected at logic step 264, the System Device Software flow loops back along a flow path 265 to functional block 262 to wait for the next poll interval to expire to continue as before described. If matching messages are detected at logic step 264, the System Device Software flow proceeds to functional block 266, where System Device Software actions are taken that correspond to matching messages as defined in functional block 261. From functional block 266, the System Device Software loops back along a flow path 267 to functional block 262 to wait for a next poll interval to expire and thereafter continue as before described.

An Objective-C code example of the System Device Software flow shown in FIG. 14, and how it might be used as described in connection with functional block 204 of FIG. 11 is as follows:

```
- (void)useRetrievalAsInGuardianSearch
{
NSArray *anActionTarget = [NSArray arrayWithObjects:self,
    @selector(handleChildFoundByResponder:), nil];
//set up mapping between update message names
//and code to execute
NSArray *messageNames = [NSArray
    arrayWithObjects:@"ChildFoundByResponder", nil];
NSArray *actions = [NSArray
    arrayWithObjects:anActionTarget, nil];
NSDictionary *mappings = [NSDictionary
    dictionaryWithObjects:actions
    forKeys:messageNames];
//set poll interval to be 15 seconds
NSTimeInterval interval = 15;
//kick off the Retrieve Updates process
[self retrieveUpdates:mappings atInterval:interval];
}
//method to execute when the
//'Child found by Responder' message occurs
- (void)handleChildFoundByResponder:(NSObject *)aMessage
{
    //...do something based on the specific message
    //...(in our example, display recovery aids)
}
//the Retrieve Updates implementation
- (void)retrieveUpdates:(NSDictionary *)actionMap
    atInterval:(NSTimeInterval)seconds
{
[NSTimer scheduledTimerWithTimeInterval:seconds target:self
    selector:@selector(actOnMessages:) userInfo:actionMap
    repeats:YES];
}
//method that executes each time the poll interval passes
- (void)actOnMessages:(NSTimer *)theTimer
{
NSDictionary *actionMap = (NSDictionary *) [theTimer
    userInfo];
```

-continued

```
//make HTTP call to server to retrieve any waiting messages
id serverResponse = [self getMessages];
//parse response from server into array of messages
NSArray *messages = [self parseMessages:serverResponse];
for (MyMessage *aMessage in messages) {
    //retrieve appropriate action for our message
    NSArray *anActionTarget = (NSArray *) [actionMap
        objectForKey:[aMessage
        messageName]];
    if (anActionTarget)
    {
        //execute appropriate action
        NSObject *target = (NSObject
            *)[anActionTarget objectAtIndex:0];
        SEL selector = (SEL)[anActionTarget
            objectAtIndex:1];
        [target performSelector:selector
            withObject:aMessage];
    }
}
}
//method that asks server for any available update messages
- (id)getMessages
{
id serverResponse;
//...code to make HTTPS GET to retrieve unparsed messages
//...(see documentation provided by Apple, Inc.)
```

-continued

```
    return serverResponse;
}
{
    NSArray *messages = [NSMutableArray array];
    //...code to parse serverResponse into
    // messages and place in array
    //...(based on server response format)
    return messages;
}
```

Figure 15:
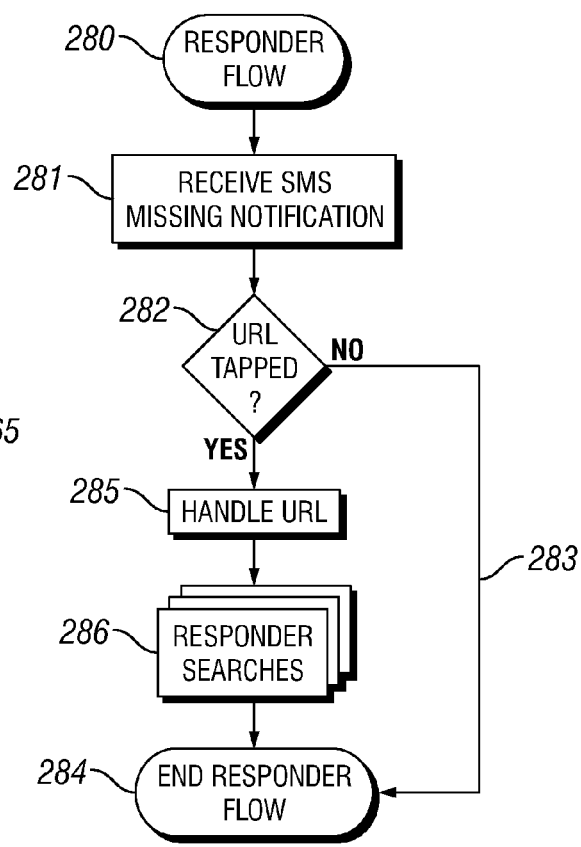
FIG. 15 is a flow diagram overview of the System Device Software function to enlist a Responder in a search.

Referring to FIG. 15, the System Device Software flow of a Responder's iPhone when the Responder has been selected to participate in a search is illustrated. The System Server Software initiates the process at logic step 280 by sending an SMS message to the Responder's iPhone if he/she is selected by the Incident Coordinator for notification about a missing child, as later described below. From logic step 280, the logic flow continues to functional block 281 where the standard SMS capability of the Reponder's iPhone receives and displays the SMS message. The SMS message would read, "A child is missing in your vicinity. Tap the URL to help find the child:" followed by a custom URL, such as: missingchild://arbitrarydomainname.com?UUID=67853B44-4E6A-1226-9D60-0050F4D00067.

Figure 16:
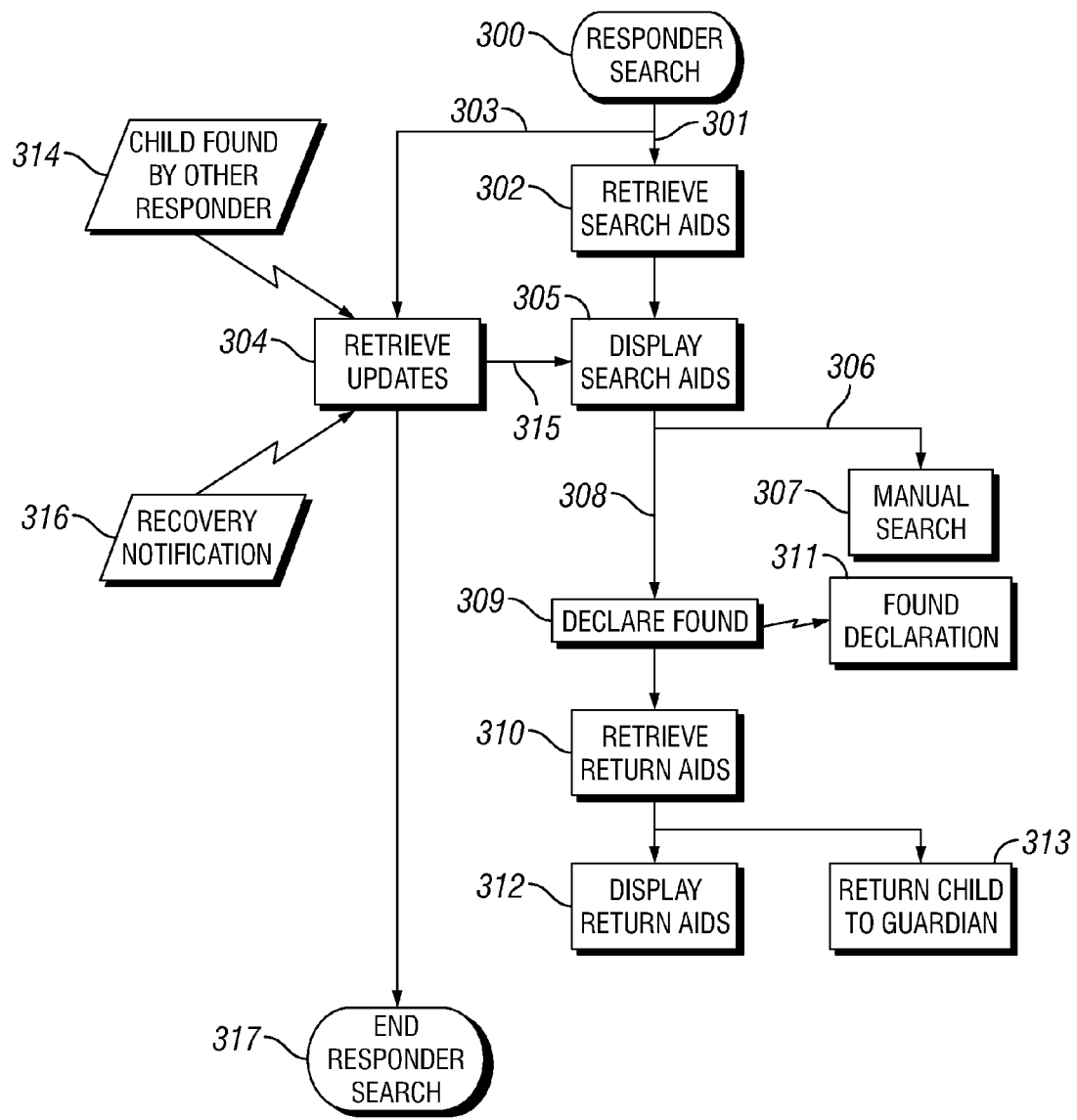
FIG. 16 is a flow diagram of the Responder search for children function of the System Device Software.

Thereafter, the System Device Software flow proceeds from functional block 281 to logic step 282 to determine whether the URL has been tapped. If not, the System Device Software flow branches along a flow path 283 to a functional block 284 where the iPhone process is exited. If the Responder clicks on the URL at logic step 282, however, the above custom "missingchild://" URL scheme is handled as described earlier, and the System Device Software flow continues to functional block 285 where the URL is parsed to retrieve the embedded UUID of the missing child. The System Device Software flow then continues to functional block 286 where the UUID of the missing child is used to initiate a Responder Search process as illustrated in FIG. 16. Upon initiating the Responder search for each of n children for whom the Responder has indicated an interest, the System Device Software flow proceeds from functional block 286 of FIG. 15 to functional block 284 to exit the process.

Referring to FIG. 16, the Responder Search process of the System Device Software is illustrated in which the process is initialized at functional block 300. From functional block 300, the System Device Software flow continues concurrently along flow path 301 and flow path 303 to functional block 302 and functional block 304 respectively.

At functional block 302, the System Device Software uses the previously determined UUID of a missing child in an HTTPS GET request to the System Server Software to retrieve identifying information of the child, including the child's name, a recent photograph of the child, and descriptive notes from the Guardian's preferences, as well as the location of the Guardian at the time the child was declared missing. The HTTPS GET request retrieves the information from the System Server Software in response to a URL such as:

https://childcare.socialmobility.net/searchAids?UUID=67853B44-4E6A-1226-9D60-0050F4D00067, where the UUID provided in the request is that of the missing child. The HTTPS GET request is handled by the System Server Software as later described below, which results in the transmission of the identifying information of the child to the System Device Software of the Responder.

From functional block 302, the System Device Software proceeds to functional block 305 to display the above identifying information to aid the Responder in the search for the child. As discussed in connection with the description of FIG. 10A, the display is scrolled to allow the same display area to be used for information regarding multiple missing children.

From functional block 305 of FIG. 16, the System Device Software proceeds concurrently along a flow path 306 to a functional block 307 to initiate a manual search for the missing child, and along a flow path 308 to a functional block 309 where a UIButton labeled "Found" is displayed to the Responder.

While waiting for the Responder to declare that the child has been found at functional block 309, the Responder's iPhone continues to display the information displayed at functional block 305, including the photograph of the missing child. The Responder thereby compares the photograph to children the Responder sees during the search, or display the photograph to bystanders to ask if they have seen the child. At such time as the Responder locates the child, the manual search at functional block 307 would end.

If and when the Responder declares at functional block 309 that the child has been found by tapping the Found button, the System Device Software moves concurrently to functional block 310 as described below, and to functional block 311 to send a Found Declaration message in the before described HTTPS format to the System Server Software. The Found Declaration message contains the UUID of the Responder, the UUID of the found child, and the Responder's current latitude and longitude values as determined by using the Core Location framework as detailed earlier.

At functional block 310, another HTTPS request is made to the System Server Software to retrieve child return aids including the Guardian's name, photograph, and cell phone number from the before described Guardian preferences. The HTTPS GET request causes the System Device Software to retrieve from the System Server Software the above information in response to an HTTPS GET request to a URL such as:

https://childcare.socialmobility.net/returnAids?UUID=67853B44-4E6A-1226-9D60-0050F4D00067, where the UUID in the request is that of the missing child. The HTTPS GET request is handled by the System Server Software as later described below, which results in the transmission of the child return aids to the System Device Software of the Responder.

The System Device Software flow continues from functional block 310 to functional block 312 and functional block 313. At functional block 312, the child return aids are displayed by the Responder's iPhone. An example of the display screen will be later described in more detail below. Concurrently, the Responder begins the manual process of returning the child to the Guardian as designated by functional block 313. When the Responder has returned the child to the Guardian, the Guardian will declare the child found as before described.

The child return aids displayed at functional block 312 continue to be displayed on the Responder's iPhone until the Responder Search is ended. The search is not ended, however, until after the Guardian has declared the child has been recovered.

The Retrieve Updates process of functional block 304, as described in detail relative to FIG. 14, and as initiated at the beginning of the Responder Search, is configured to act in response to either of two messages. If a message is received as depicted at 314 from the System Server Software indicating that another Responder has found the child, the message contains the name, photograph, location, and phone number of the Responder. The functional block 304 in turn responds by issuing commands by way of a flow path 315 to functional block 305 to update the Responder's iPhone display with the information found in the message. Even though another Responder may have claimed to have found the child, the search aids for the child that are displayed on the Responder iPhones are not removed from the display.

The second message to which the functional block 304 is configured to respond by generating actions is the message that the child has been recovered by the Guardian. This message includes the UUID of the found child.

Figure 20:
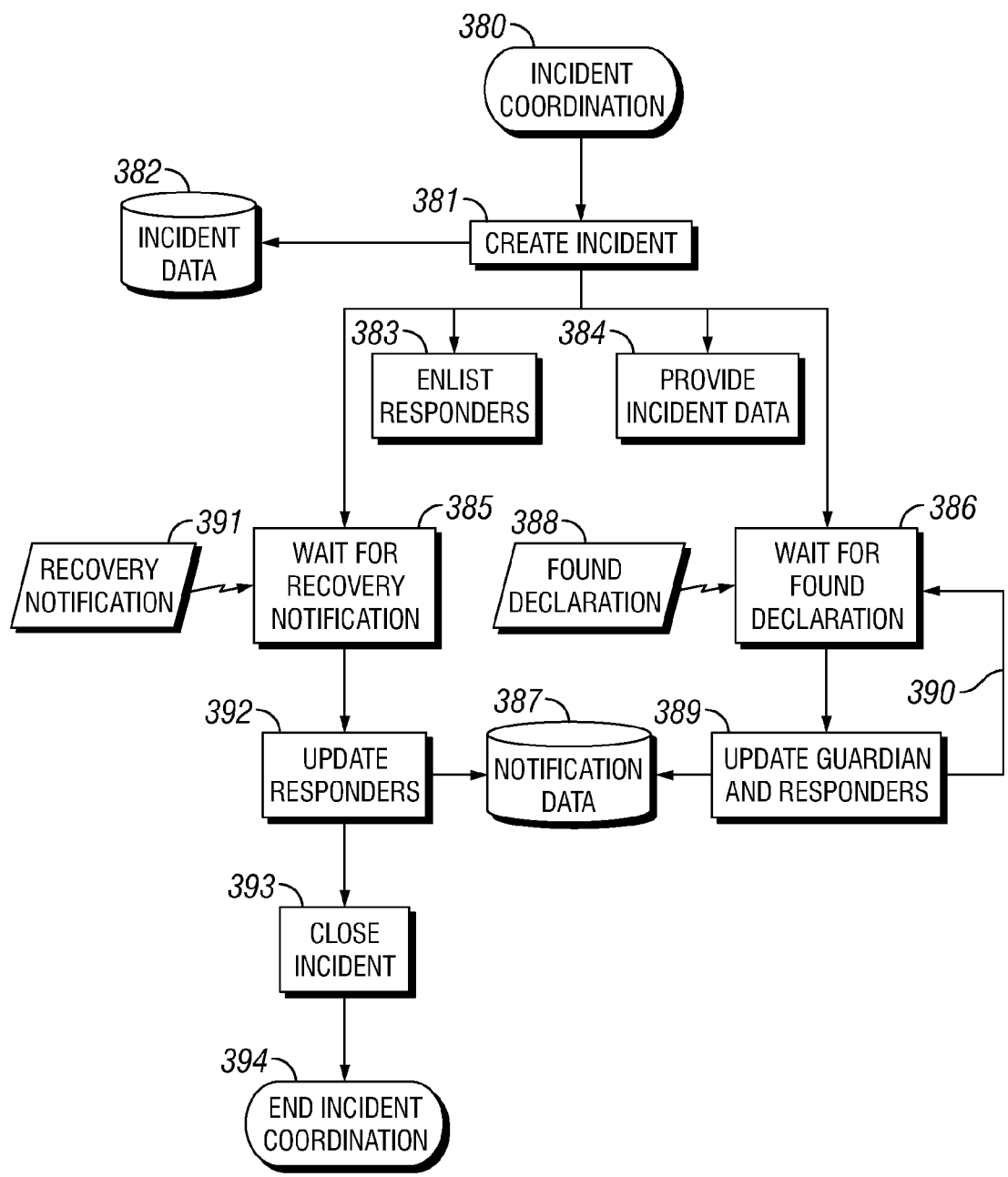
FIG. 20 is a flow diagram of the Incident Coordination function of the System Server Software.

Whether a Responder located the child and returned the child to the Guardian, or the Guardian recovered the child in another manner, when the Guardian declares the child recovered and a recovery message notification is issued by the System Server Software as described in the discussion of FIG. 20 and as depicted at 316, and received by functional block 304, the logic flow then continues from functional block 304 to functional block 317. At functional block 317, the Responder Search process for that child is ended, and the search aids and return aids for the child are removed from the display of functional blocks 305 and 312 respectively. In further response thereto, the System Device Software may cause an audible alert and an iPhone vibration to occur. These features are described in the section "Using Sound in iPhone OS" of the iPhone OS Programming Guide offered commercially by Apple.

Figure 17:
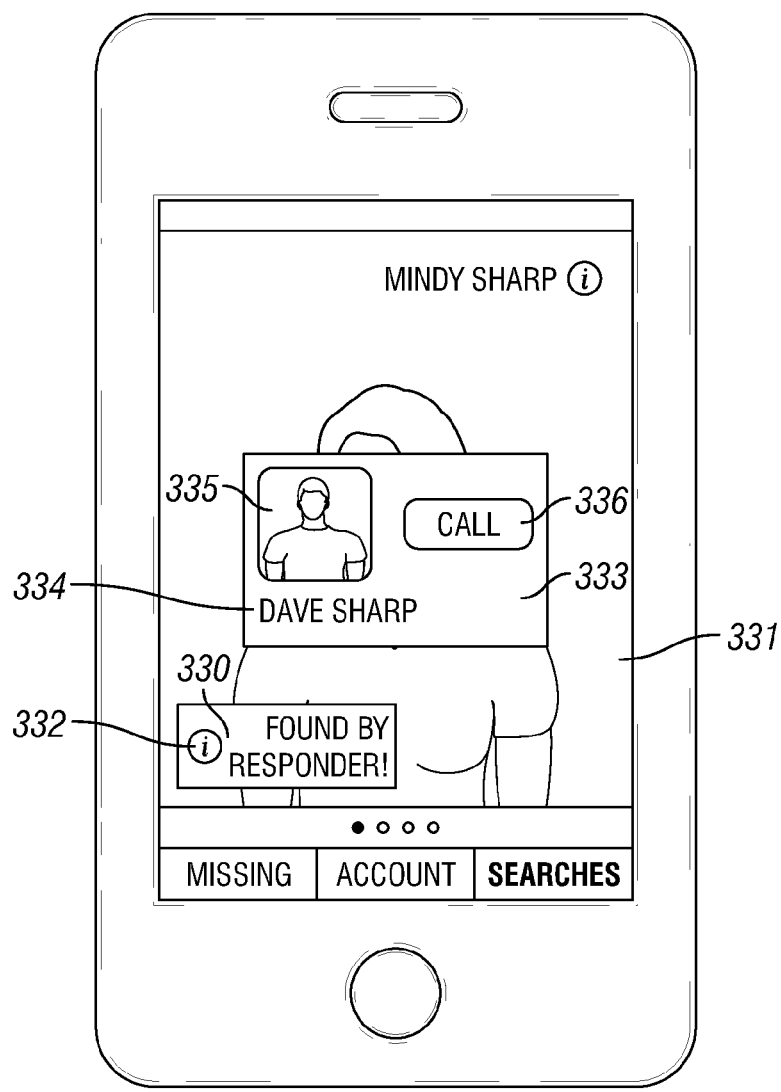
FIG. 17 depicts the display of return aids in the Searches user interface of the System Device Software.

Referring to FIG. 17, the Responder's iPhone display produced by the System Device Software at functional block 310 of FIG. 16 is shown, which presents information to assist the Responder in returning the child to the Guardian after the Responder has declared that the missing child has been found.

Continuing with FIG. 17, image 330 is a UIView that is displayed prominently over a portion of the image 331 of the missing child, and that includes a UILabel whose text declares that the child has been found by a Responder. The image 330 also includes a UIButton image 332 that when tapped toggles the visibility of a UIView image 333 to alternatively display the image described below, or the unobstructed image 331 of the missing child. Since the Responder has already declared that they have found the child, the UIButton that was used to declare that the Responder found the child is not included in the display of FIG. 17.

The UIView image 333 is superimposed over background image 331, and includes three elements: a UILabel 334 displaying the name of the Guardian, a UIImageView image 335 that is a display of the photograph of the Guardian, and a UIButton image 336 that when pressed causes the iPhone to place a phone call to the Guardian's iPhone.

An embodiment of System Device Software for the Guardian and Responder iPhones referred to as mobile cellular phones 1 and 3 of FIG. 1 has been described above.

In order to complete the description of embodiments of the invention, reference is made to the system servers 10 of FIG. 1 and to the System Server Software embodiment that is executed by them. Unlike the System Device Software that may be installed on many Guardian and Responder iPhones, the System Server Software is installed on a single computer that is able through use of TCP/IP to communicate over the Internet and with cellular phones 1 and 3 of FIG. 1.

The system servers 10 may be comprised of any of a wide variety of computing hardware, including the XServe model MA882LL/A that is offered commercially by Apple, and the Sun Fire X4150 Server that is offered commercially by Sun Microsystems. Such computer hardware is capable of running the following software that provides desired functionality for the average software developer skilled in the art of enterprise Java development with Java EE 5 to produce a System Server Software embodiment of the present invention.

The primary software environment for the System Server Software is the 5.0 version of the JBoss Application Server (JBoss AS). JBoss AS is available from JBoss.org, an open source development community related to the JBoss division of Red Hat, Inc. Downloads and documentation for the above named JBoss software is available on the Internet at http://www.jboss.org/. The publicly available documentation discloses the standard procedures for installing and running JBoss AS, and for developing, installing and running software components written to the Java EE 5 specification, as is the System Server Software for the system servers 10 of FIG. 1. For reference, detailed documentation of Java EE 5, the Java language, and various related specifications is provided by Sun Microsystems, Inc. on the Internet at http://www.sun.com/java/, and by the Java Community ProcessSM Program at http://jcp.org/. Where noted, Guardian and Responder preferences as well as incident data and notification data is stored by the System Server Software in an Oracle 10 g database (Oracle DB) as available from Oracle Corporation (Oracle). The Oracle DB software executes along with the JBoss AS software on the system servers 10 of FIG. 1. JBoss AS documentation and Java EE 5 documentation demonstrates how to configure JBoss AS to make use of the Oracle DB instance for data storage, as well as how to use the EJB3 portion of the Java EE 5 specification to allow software components to create, read, update and delete data in the Oracle DB.

A detailed description of the System Server Software in accordance with embodiments of the invention follows with reference to FIGS. 18 through 22.

Figure 18:
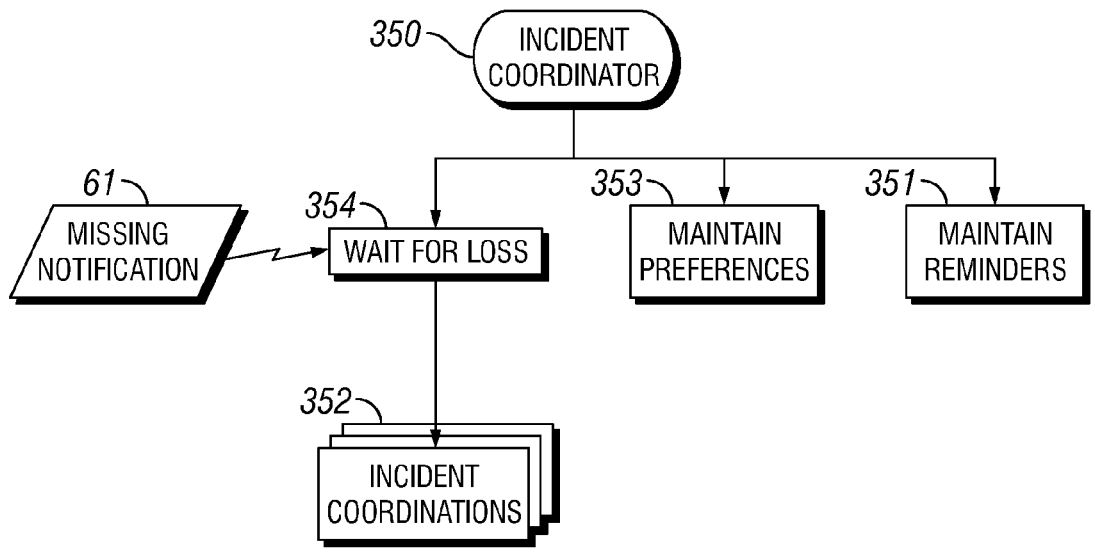
FIG. 18 is a flow diagram overview of the System Server Software functions.

Referring to FIG. 18, the overall System Server Software process for the system servers 10 is illustrated as Incident Coordinator functionality. The Incident Coordinator is packaged as an "enterprise archive" (.ear) as described in the JBoss AS documentation identified above. The Incident Coordinator can be easily deployed and run in JBoss AS. Within the practical bounds required by hardware maintenance, once deployed and run, the Incident Coordinator functions should be left running on the system servers 10 to execute indefinitely for the life of a system in which the invention is embodied. The JBoss AS documentation includes instructions on how to run enterprise archives such as the Incident Coordinator on a cluster of equivalent JBoss AS servers, so that any one server can be brought down for maintenance without affecting the operation of the other servers which remain active.

The Incident Coordinator consists of three major functions: storing Guardian and Responder preferences received from the System Device Software as indicated by functional block 353 of FIG. 18; providing photo update reminders for Guardians as indicated by functional block 351, and coordinating status and communications during an incident of a particular Guardian losing track of a child as indicated by functional block 352. Process Maintain Preferences of functional block 353 is described in detail below in the discussion of FIG. 19. Process Maintain Reminders of functional block 351 is described in detail below in the discussion of FIG. 21.

Referring again to FIG. 18, the Incident Coordinator process is initiated upon entry in functional block 350, after which the System Server Software activates functional blocks 353, 351, and 354 to begin processing immediately and continue to execute for the lifetime of a system embodiment of the invention.

Functional block 354 waits for a Missing Notification message as depicted at 61 that indicates that a Guardian has declared a child missing. The message contains the Guardian's location as latitude and longitude, the date and time of the declaration, the UUID of the Guardian, and the UUID of each child that is missing. In order to receive the message over HTTPS, functional block 354 is implemented as a Java Servlet that responds to HTTPS POSTs to a URL such as the following:

https://childcare.socialmobility.net/missingchild.

Implementation of the Java Servlet is in accordance with the before identified documentation provided by JBoss.org and Sun Microsystems, Inc., which includes a description of the use in JBoss AS of Java Secure Socket Extensions (JSSE) to provide SSL encryption of the HTTPS communications.

For each missing child indicated in the message received at functional block 354, the System Server Software flow as implemented by the Servlet continues to execute an instance of Incident Coordination at functional block 352. Incident Coordination functional block 352, where the System Server Software selects and enlists Responders to assist in the search and provides for search status updates between the Guardian and enlisted Responders, is described in more detail later relative to FIG. 20. During and after execution of an Incident Coordination for each missing child at functional block 352, the System Server Software continues to wait for other missing children notifications at functional block 354 that cause new instances of Incident Coordination to occur at functional block 352. The ability of the Servlet to simultaneously process multiple HTTPS calls in Servlet threads is as defined earlier in the definition of Servlet and in the before identified Java EE 5 specification.

Figure 19:
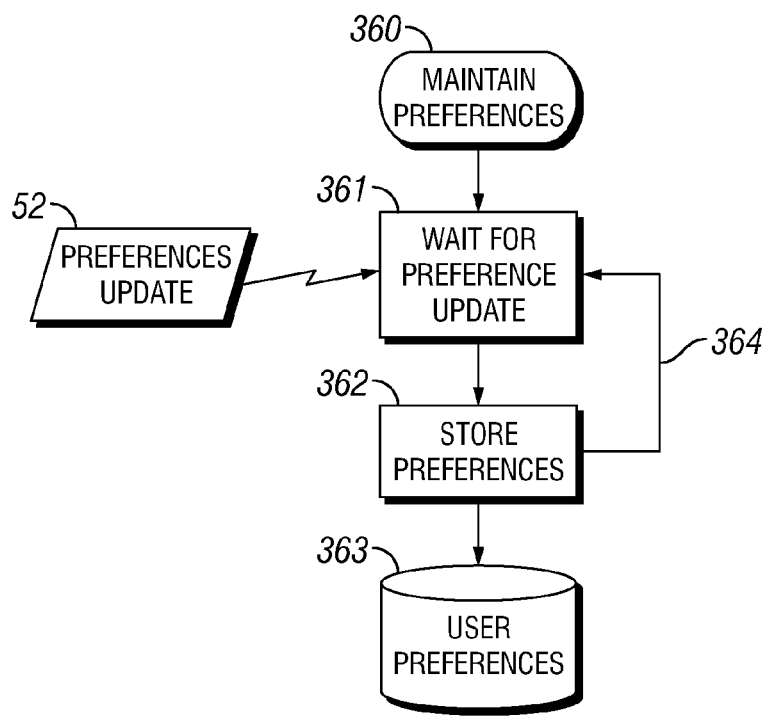
FIG. 19 is a flow diagram of the Maintain Preferences function of the System Server Software.

Referring to FIG. 19, the System Server Software flow for the Maintain Preferences process of functional block 353 of FIG. 18 is illustrated. Returning to FIG. 19, the System Server Software will receive preference update messages from the System Device Software of the Guardian and Responder iPhones as discussed earlier regarding FIG. 3, and update the preferences stored on the system servers 10 for later use if the Guardian or Responder is involved in a search for a missing child. The preferences may include information about the Guardian or Responder such as his/her name, photo, UUID, and cell phone number. For the Guardian, preferences may also include the names, photos, notes and UUIDs of children in the care of the Guardian, and preferences regarding the desired frequency of receiving photo update reminders. For the Responder, preferences may also include the name, latitude and longitude of Response Locations where the Responder is willing to participate in searches for missing children.

The System Server Software initializes the process at functional block 360 of FIG. 19, and then continues to a functional block 361 where it waits for Preferences Update messages 52 sent to the System Server Software by the System Device Software of Users. The logic of functional blocks 361 and 362 is embodied as a Java Servlet responding to Preferences Updates messages 52 in the form of HTTPS POSTs to a URL such as:

https://childcare.socialmobility.net/preferences.

Each time a Preferences Updates message 62 is received at functional block 361, the Servlet flow proceeds from functional block 361 to functional block 362 where data from the message is stored in the User Preferences data storage 363. User Preferences data storage 363 is comprised of database tables in Oracle DB residing on the system servers 10 of FIG. 1. The data stored in User Preferences 363 of FIG. 19 is keyed by the identity of the User for later use. It should be understood by one skilled in the art that Preference Update messages 52 at times require the creation, update, or deletion of data records in User Preferences 363. By way of example, the addition of a new Response Location by the User would require the creation of a new record in User Preferences 363 to store that information, while the deletion of the Response Location by the User would require deletion of the corresponding record in User Preferences 363.

As an aid in better understanding the storage of information by the System Server Software on system servers 10 of FIG. 1 as described later, it should be understood that Device Storage 51 of FIG. 3 as described earlier resides on the mobile cellular phones 1 and 3 of FIG. 1 and not on system servers 10. While preferences of the Guardian and Responder, who may also be referred to as User, are stored in Device Storage 51 as previously discussed, it should be understood that Device Storage 51 is distinct from User Preferences 363 of FIGS. 19, 21 and 22. Like Device Storage 51 of FIG. 3, User Preferences 363 of FIG. 19 also stores preferences of the Guardian and Responder, but User Preferences 363 resides in Oracle DB on the system servers 10 of FIG. 1. Furthermore, while Device Storage 51 is accessed by the System Device Software and stores the preferences of the single User of the cellular phone, User Preferences 363 of FIG. 19 is accessed by the System Server Software and stores the preferences of all Users of an embodiment of the present invention. As a further aid, it should be understood that database Incident Data 382 of FIGS. 20 and 22 and database Notification Data 387 of FIG. 20 are accessed by the System Server Software and reside in Oracle DB on the system servers 10 of FIG. 1.

Returning to FIG. 19, when the process of functional block 362 is complete, the System Server Software flow then loops back along flow path 364 to functional block 361 to continue waiting for further Preferences Update messages 52.

Referring to FIG. 20, the System Server Software flow occurring during the execution of an Incident Coordination as shown at functional block 352 of FIG. 18 is illustrated. The Incident Coordination process is entered at functional block 380 of FIG. 20, from which the System Server Software flow continues to a functional block 381 where data describing the Incident including the child's name, UUID, photo, and description; the Guardian's name, UUID and photo; and the date, time and location of the Incident inception is stored in Incident Data storage 382. The data to be stored in Incident Data Storage 382 that is not available from the Missing Notification 61 received at functional block 354 of FIG. 18, is retrieved from User Preferences 363. Referring again to FIG. 20, Incident Data storage 382 is comprised of database tables in Oracle DB residing on the system servers 10 of FIG. 1. The incident data of each Missing Child Incident is given a unique ID that is used to distinguish it from data of other incidents. The natural key that distinguishes one Missing Child Incident from others is the combination of inception date and time, Guardian UUID, and child UUID.

From functional block 381, the System Server Software flow continues concurrently to functional blocks 383, 384, 385, and 386. At functional block 383, a process for enlisting the assistance of Responders is initiated as will be described in more detail below. As Responders are enlisted, their identity is linked to incident data stored at functional block 382 for later use.

At functional block 384 the System Server Software waits continuously for the arrival of information requests in the form of HTTPS GET requests from the System Device Software of Users. When such requests are received, the System Server Software initiates a thread of Java Servlet execution to respond to each request. In this manner, functional block 384 provides incident and identifying data to the Guardian and enlisted Responders in response to HTTPS GET requests generated during the Guardian and Responder Search process as described in the description of functional blocks 212 of FIG. 11, 263 of FIG. 14, and 302 and 310 of FIG. 16. The Java Servlets use data from the URLs of the HTTPS GET requests as keys in database lookups to retrieve information from Incident Data storage 382 of FIG. 20, Notification Data storage 387, and User Preferences data storage 363 of FIG. 19. The retrieved information then is sent to the System Device Software of the Guardian or Responder in the response to the HTTPS GET requests.

The Java Servlet of functional block 384 of FIG. 20, in responding to a URL as described in the discussion of functional block 263 of FIG. 14, uses the UUID provided in the URL as a key in a database lookup for previously undelivered messages stored according to that UUID in Notification Data storage 387 of FIG. 20. The Java Servlet then returns any such messages to the System Device Software and marks them as delivered in Notification Data storage 387.

The Java Servlet of functional block 384, in responding to a URL as described in the discussion of functional block 212 of FIG. 11, uses the UUID provided in the URL as a key in a database lookup for identifying information of the Responder corresponding to the UUID stored in User Preferences data storage 363 of FIG. 19. The Java Servlet, then returns the identifying information to the System Device Software.

The Java Servlet of functional block 384 of FIG. 20, in responding to a URL as described in the discussion of functional block 310 of FIG. 16, uses the UUID provided in the URL as a key in a database lookup in User Preferences data storage 363 of FIG. 19 to determine the Guardian identity related to the child identified by the UUID. The Java Servlet then retrieves the identifying information of the Guardian as stored in User Preferences data storage 363 of FIG. 19, and returns the identifying information to the System Device Software.

The Java Servlet of functional block 384, in responding to a URL as described in the discussion of functional block 302 of FIG. 16, uses the UUID provided in the URL as a key in a database lookup for identifying information of the child identified by the UUID as stored in User Preferences data storage 363 of FIG. 19. The Java Servlet then, returns the identifying information to the System Device Software. In each of the above Java Servlet cases, return of the response to the HTTPS GET request ends the functional logic of the Java Servlet thread, and functional block 384 of FIG. 20 waits for further HTTPS GET requests to trigger further Servlet executions.

At functional block 386, the System Server Software waits continuously for the arrival of Found Declaration messages, as depicted at 388, from the System Device Software of Responders indicating that a Responder has located the child. Found Declaration messages 388 arrive as HTTPS GET requests for URLs such as:

https://childcare.socialmobility.net/foundchild?ruid=8329B283-83FB-3823-9843-3037F832A038&cuid=67853B44-4E6A-1226-9D60-0050F4D00067&rlat=37.37&rlong=−121.92, where the Responder's UUID is provided as the value for argument "mid", the found child's UUID as the value for argument "cuid", and the Responder's latitude and longitude are provided as the values for "rlat" and "rlong" respectively. When such a Found Declaration message is received by the System Server Software from functional block 311 of FIG. 16, the System Server Software at functional block 386 of FIG. 20 initiates a thread of Java Servlet execution to perform the logic of functional block 389.

At functional block 389 the Java Servlet first records the information contained in the message to Incident Data Storage 382, and then the Guardian and all Responders enlisted for the Missing Child Incident under consideration are notified that the Responder has located the child. To do so, the Java Servlet queries the Incident Data storage 382 to obtain the Guardian identity and the list of Responders enlisted at functional block 383. The name, photo, and phone number of the Responder who located the child is determined from the User Preferences records 363 as described earlier with FIG. 19. Notification messages for the Guardian and for each Responder, indicating that the child has been found as well as the name, photo, UUID, location and phone number of the Responder who found the child, are then created in Notification Data storage 387 of FIG. 20. This completes the functional logic of the Java Servlet thread responding to the Found Declaration 388, and the logical flow of the System Server Software continues from functional block 389 along flow path 390 to loop back to functional block 386 to await receipt of further messages to trigger Servlet execution. The notification messages created in Notification Data storage 387 are later retrieved by the Guardian and Responders as described above regarding functional block 384.

At functional block 385, the System Server Software waits continuously for the arrival of Recovery Notification messages depicted at 209 from the System Device Software of the Guardian indicating that the Guardian has recovered the child. Recovery Notification messages 209 arrive as HTTPS GET requests for URLs such as:

https://childcare.socialmobility.net/recoveredchild?guid=8329B283-83FB-3823-9843-3037F832A038&cuid=67853B44-4E6A-1226-9D60-0050F4D00067, where the Guardian's UUID is provided as the value for argument "guid" and the recovered child's UUID is provided as the value for argument "cuid". When such a Recovery Notification message is received by the System Server Software at functional block 209, the System Server Software at functional block 385 initiates a thread of Java Servlet execution to perform the combined logic of functional blocks 392, 393 and 394. Logic flow of the Java Servlet proceeds first to functional block 392, where the Java Servlet first records the information contained in the message to Incident Data storage 382, and then notifies all Responders enlisted for the specific Incident under consideration that the Guardian has recovered the child. To do so, the Java Servlet queries the Incident Data storage 382 to obtain the list of Responders enlisted at functional block 383. Notification messages for each Responder indicating that the child has been recovered by the Guardian are then created in Notification Data storage 387. The notification messages are later retrieved by the Responders as described earlier regarding functional block 384.

From functional block 392 the Java Servlet flow continues to functional block 393 where the Missing Child Incident that was created at functional block 381 is closed. This involves recording in the Incident Data storage 382 that the child was recovered by the Guardian, as well as the date and time of the incident closure. The System Server Software flow then proceeds from functional block 393 to functional block 394 to end the functional logic of the Java Servlet thread and end the logical flow of the Incident Coordination process.

Figure 21:
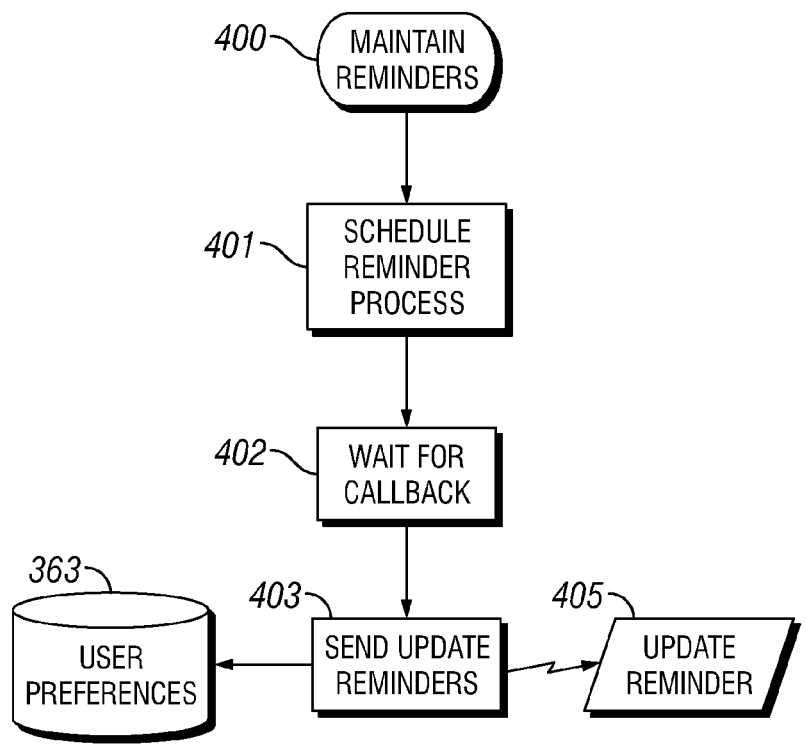
FIG. 21 is a flow diagram of the Maintain Reminders function of the System Server Software.

Referring to FIG. 21, the System Server Software process executed by functional block 351 of FIG. 18 is shown. This is the process that controls the System Server Software in periodically sending messages to a Guardian's iPhone to remind him/her to update the photographs and other identifying information of his children. The System Server Software begins the process by entering at functional block 400 of FIG. 21 and then proceeding to functional block 401.

At functional block 401, the System Server Software is configured at startup to launch a daily process that sends update reminders to the Guardian's iPhone. This configuration makes use of the org.jboss.varia.scheduler.Scheduler (hereafter "Scheduler") Class, as discussed in the JBoss AS documentation, to establish a process that runs in JBoss AS and executes functional blocks 402 and 403 once per day. The System Server Software flow then continues from functional block 401 to functional block 402, where the System Server Software waits for the Scheduler Class to trigger. When the Scheduler Class triggers in accordance with the daily schedule, the System Server Software flow proceeds from functional block 402 to functional block 403.

At functional block 403, the System Server Software queries the User Preferences database 363 of FIG. 19 for a list of those Guardians who have requested a reminder to update their photographs within a scheduled period of time and have one or more photographs older than the scheduled period of time. The System Server Software then iterates through the resulting list of Guardians and sends an SMS reminder message at Update Reminder functional block 405 that appears on the Guardian's iPhone as discussed earlier relative to FIG. 13. If a single child's photo is out of date, the UUID of that child is included in the message. If multiple children's photographs are out of date, no UUID is sent and as described earlier the iPhone will interpret this as a reminder to update the photographs for all of the children. If the Guardian does not update the photographs as a result of the reminder, another update reminder will be sent each subsequent day until the photos are updated. SMS messages are sent in the manner described later regarding functional block 412 of FIG. 22.

Figure 22:
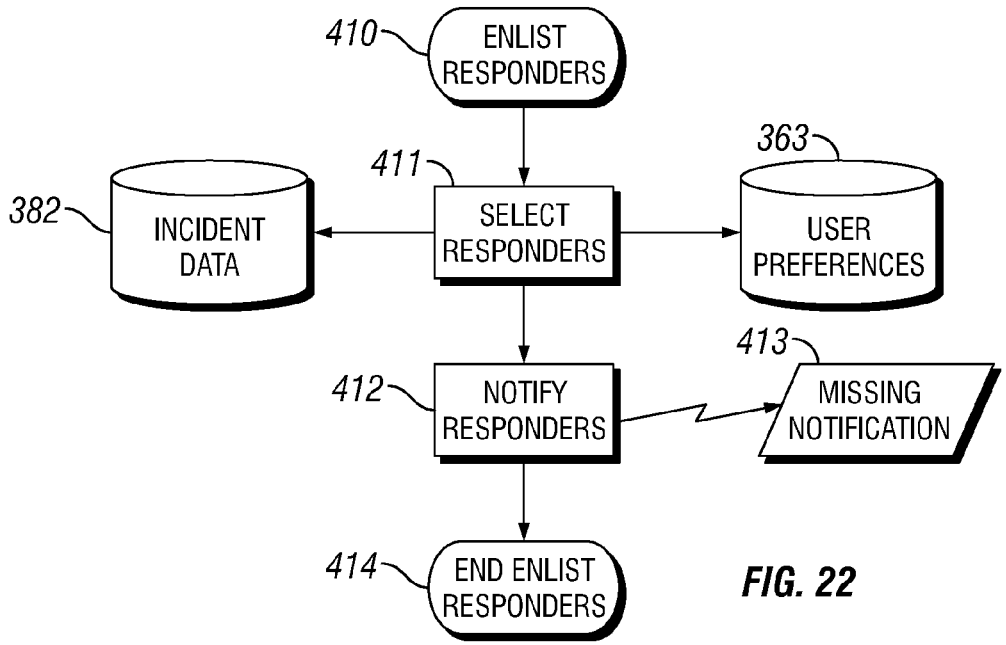
FIG. 22 is a flow diagram of the Enlist Responders subprocess of the Incident Coordination function of the System Server Software.

Referring to FIG. 22, the functional block Enlist Responders 383 of FIG. 20 is illustrated in more detail. The Enlist Responders process begins in FIG. 22 with the System Server Software entry at functional block 410. From functional block 410, the System Server Software flow continues to functional block 411 to select a list of Responders based upon Missing Child Incident Data stored in Incident Data storage 382 and User Preferences of the Responders stored in User Preferences data storage 363 of FIG. 19.

From the Missing Child Incident Data storage 382, the Enlist Responders process determines the UUID of the missing child, and the latitude and longitude of the Guardian's location when he/she declared the loss of the child. Responders previously will have declared preferences for latitude and longitude values of locations where they may search for missing children. By comparing the location of the loss declaration with the search locations of each Responder, the System Server Software determines which search locations are within a pre-determined tolerance, such as one mile, from the location of loss. Various applicable mathematical methods are publicly available for determining the approximate distance between any two locations defined by latitude and longitude, such as the Thaddeus Vincenty formula provided on the Internet at http://www.movable-type.co.uk/scripts/latlong-vincenty.html, and the Free Location API implementation for Java offered on the Internet at http://sourceforge.net/projects/flopi/.

The Responders for the response locations that are within tolerance are selected to be notified of the Missing Child Incident so that they may be enlisted to search. The phone numbers of the Responders are retrieved from User Preferences data storage 363 of FIGS. 19, 21 and 22.

Data Storage Description

In the above description of embodiments, the system servers 10 of FIG. 1 are described as storing data in three storage units: User Preferences Unit 363, Incident Data Unit 382, and Notification Data Unit 387. In an embodiment, the User Preferences Unit 363 is comprised of a user table, a children's table, and a response locations table. The Incident Data Unit 382 is comprised of an incident table and an incident responders table. The Notification Data Unit 387 is comprised of a notification data table. Each of the data tables is constructed in Oracle DB using the following information where Primary Key columns are indicated with a "Y" in the PK column, and Foreign Key columns are indicated with a "Y" in the FK column. A record in the user table of User Preferences Unit 363 contains descriptive data about a User. Its columns are described as follows:

TABLE I

| Column | PK | FK | Data Type |
| --- | --- | --- | --- |
| USER_ID | Y | N | NUMBER |
| USER_UUID | N | N | VARCHAR2 |
| FIRST_NAME | N | N | VARCHAR2 |
| LAST_NAME | N | N | VARCHAR2 |
| PHONE_NUMBER | N | N | VARCHAR2 |
| PHOTO | N | N | BLOB (Binary Large Object) |
| REMINDER_PERIOD | N | N | NUMBER |

In Table I above, the REMINDER_PERIOD column holds values that represent the desired frequency of update reminders.

A record in the response location Table II of User Preferences Unit 363 contains descriptive data about a Response Location defined by the User. Its columns are described as follows:

TABLE II

| Column | PK | FK | Data Type |
| --- | --- | --- | --- |
| LOCATION_ID | Y | N | NUMBER |
| USER_ID | N | Y | NUMBER |
| NAME | N | N | VARCHAR2 |

TABLE II-continued

| Column | PK | FK | Data Type |
| --- | --- | --- | --- |
| LATITUDE | N | N | NUMBER |
| LONGITUDE | N | N | NUMBER |

Table II has a one-to-many relationship from the user table with zero-to-many cardinality, and is defined by the USER_ID Foreign Key matching the USER_ID Primary Key of the related record in the user table.

A record in the children's Table III of User Preferences Unit 363 contains descriptive data about a child defined by the User. Its columns are described as follows:

TABLE III

| Column | PK | FK | Data Type |
| --- | --- | --- | --- |
| CHILD_ID | Y | N | NUMBER |
| USER_ID | N | Y | NUMBER |
| CHILD_UUID | N | N | VARCHAR2 |
| FIRST_NAME | N | N | VARCHAR2 |
| LAST_NAME | N | N | VARCHAR2 |
| PHOTO | N | N | BLOB |
| PHOTO_DATETIME | N | N | DATE |
| DESCRIPTION | N | N | VARCHAR2 |

The children's Table III has a one-to-many relationship from the User Table I with one-to-many cardinality, and is defined by the USER_ID Foreign Key matching the USER_ID Primary Key of the related record in the User Table I. Any time the PHOTO field is updated with a new photo, the PHOTO_DATETIME field should be updated to the current date to enable the age of photos to be later determined.

A record in the incident Table IV of Incident Data Unit 382 contains descriptive data about a Missing child Incident, and is related to the User Table I record of the Guardian who declared the Missing Child Incident, and to the record in the children's Table III of the child who was declared missing. The columns of Table IV are as follows:

TABLE IV

| Column | PK | FK | Data Type |
| --- | --- | --- | --- |
| INCIDENT_ID | Y | N | NUMBER |
| CHILD_ID | N | Y | NUMBER |
| USER_ID | N | Y | NUMBER |
| START_LATITUDE | N | N | NUMBER |
| START_LONGITUDE | N | N | NUMBER |
| START_DATETIME | N | N | DATE |
| CHILD_FIRST_NAME | N | N | VARCHAR2 |
| CHILD_LAST_NAME | N | N | VARCHAR2 |
| CHILD_UUID | N | N | VARCHAR2 |
| CHILD_PHOTO | N | N | BLOB |
| CHILD_DESCRIPTION | N | N | VARCHAR2 |
| GUARDIAN_FIRST_NAME | N | N | VARCHAR2 |
| GUARDIAN_LAST_NAME | N | N | VARCHAR2 |
| GUARDIAN_UUID | N | N | VARCHAR2 |
| GUARDIAN_PHOTO | N | N | BLOB |
| CHILD_FOUND | N | N | Boolean |
| CHILD_RECOVERED | N | N | Boolean |
| END_DATETIME | N | N | DATE |

The incident Table IV has a one-to-many relationship from the User Table I with zero-to-many cardinality, and is defined by the USER_ID Foreign Key matching the USER_ID Primary Key of the related record in the User Table I. The incident Table IV also has a one-to-many relationship from the children's Table III with zero-to-many cardinality, and is defined by the CHILD_ID Foreign Key matching the CHILD_ID Primary Key of the related record in the children's Table III. The following column data is copied from the columns of the related children's Table III record and User Table I record when the incident Table IV record is created to ensure that the state of this data at the time of the Missing Child Incident is recorded for historical purposes, even if the related children's Table III and User Table I later changes: CHILD_FIRST_NAME, CHILD_LAST_NAME, CHILD_UUID, CHILD_PHOTO, CHILD_DESCRIPTION, GUARDIAN_FIRST_NAME, GUARDIAN_LAST_NAME, GUARDIAN_UUID, and GUARDIAN_PHOTO. CHILD_FOUND_and CHILD_RECOVERED_default to false.

The incident Responders Table V of Incident Data Unit 382 is a many-to-many mapping table that relates a User Table I record to an incident Table IV record when the User represented by the User Table I record has been enlisted as a Responder for the incident. A record in the incident Responder's Table V contains a reference to the incident, a reference to the User, and information regarding the User's activity relative to the incident. The columns of Table V are as follows:

TABLE V

| Column | PK | FK | Data Type |
| --- | --- | --- | --- |
| INCIDENT_ID | Y | Y | NUMBER |
| USER_ID | Y | Y | NUMBER |
| FOUND_CHILD | N | N | Boolean |
| FOUND_LATITUDE | N | N | NUMBER |
| FOUND_LONGITUDE | N | N | NUMBER |

The incident Responder's Table V has a one-to-many relationship from the incident Table IV with zero-to-many cardinality, and which is defined by the INCIDENT_ID Foreign Key matching the INCIDENT_ID Primary Key of the related record in the incident Table IV. The incident Responder's Table V has a one-to-many relationship from the User Table I with zero-to-many cardinality, and which is defined by the USER_ID Foreign Key matching the USER_ID Primary Key of the related record in the User Table I. The FOUND_CHILD field for a record in the incident Responder's Table V defaults to false, and is set to true if the associated Responder declares the child has been found. At that time, the current latitude and longitude of the Responder is recorded in FOUND_LATITUDE and FOUND_LONGITUDE, respectively.

A record in the notification data Table VI of Notification Data Unit 387 contains descriptive data about a message intended to be delivered to a User. The columns of Table VI are as follows:

TABLE VI

| Column | PK | FK | Data Type |
| --- | --- | --- | --- |
| NOTIFICATION_ID | Y | N | NUMBER |
| USER_ID | N | Y | NUMBER |
| USER_UUID | N | N | VARCHAR |
| MESSAGE | N | N | BLOB |
| DELIVERED | N | N | Boolean |

The notification data Table VI has a one-to-many relationship from the User Table I with zero-to-many cardinality, and is defined by the USER_ID Foreign Key matching the USER_ID Primary Key of the related record in the User Table I. The USER UUID is copied from the related record in the User Table I when the notification data record is created for later convenience when finding undelivered messages for a given User. The DELIVERED field defaults to false, and is set to true when the message is delivered.

Returning to the description of FIG. 22, the System Server Software flow moves from functional block 411 to functional block 412 where the information retrieved at functional block 411 is used to notify each selected Responder by sending an SMS message to his/her cell phone. The SMS message contains the UUID of the missing child in the form of the URL as detailed earlier in the discussion of functional block 281 of FIG. 15 that allows the selected Responders to initiate their search for the child.

The device receiving the SMS message for the Responders is the iPhone, and all iPhones in the United States are intended for use on the AT&T network. AT&T provides an email-to-SMS gateway, so that any E-Mail sent to "<phonenumber>@txt.att.net", where "<phonenumber>" is the actual ten digit phone number of the phone, is forwarded as an SMS message to the phone. Other gateways are available for other cell network providers internationally.

Functional block 412 of FIG. 22 uses the JavaMail API provided by Java EE 5 to send the Missing Notification depicted at 413 as an E-Mail to each Responder's phone number through the email-to-SMS gateway. The E-Mail arrives at the Responder's iPhone as an SMS message as discussed earlier regarding functional block 281 of FIG. 15.

From functional block 412 of FIG. 22, the System Server Software flow proceeds to functional block 414 to end the Enlist Responders process.

The description above is intended to support the making and use of an embodiment by a person skilled in the computer software development and data processing arts. What follows is a discussion of alternative embodiments of the invention that provide additional features differing from the embodiments of the invention described previously. Upon disclosure of an embodiment of the invention as provided herein and of the following information, a person skilled in the arts of computer software development and data processing can make and use the alternative embodiments of the invention described below.

In some embodiments of the invention, the system server of the present invention may store preferences data including one or more of height, weight, color of clothing, color of skin, color of hair, color of eyes, list of Responders to contact, frequency of update reminders, data privacy guidelines for selection of Responders, criteria for expanding a search to include third parties, criteria for escalating a search, and criteria for deescalating a search. By way of example, a server may store a Guardian's textual description of a child including the child's height, weight, skin color, hair color, and eye color for distribution to Responders during a Missing Child Incident. In another example, a server stores a Guardian's list of desired known Responders together with privacy guidelines that instruct the server in the event of a Missing Child Incident to contact members on the list, plus any nearby Responders whose identities have been verified by a third party. In still another example, a server stores preference data for particular geographic regions that establish different elapsed time thresholds for escalating a search to a larger geographic area, and that establish different elapsed time thresholds for expanding the search to include law enforcement.

In an alternative embodiment of the invention, the User establishes and maintains his/her preferences and identifying information by way of a web page provided by a Java Servlet executing on the System Server Software, and viewed from any computer 12 of FIG. 1 having a web browser as described earlier. The System Server Software would then provide the updated user preferences and identifying information to User devices running System Device Software in a manner similar to the provision of incident data updates by the System Server Software in functional block 384 of FIG. 20, and retrieved by the System Device Software as in the Retrieve Updates process of FIG. 14. Once retrieved by the System Device Software, user preferences and identifying information would be stored in Device Storage 51 of FIG. 3.

In an alternative embodiment of the invention, functions attributed to the System Device Software in an embodiment are performed on a variety of cellular phone devices without installation of System Device Software. The lack of GPS integration and other differences in such an approach may limit the functionality relative to an embodiment, but significant features of the present invention could still be performed. Remaining functions may be performed by way of a web page provided by a Java Servlet executing on the System Server Software and viewed on the user's cellular phone device by way of a web browser provided by the cellular phone device. The System Server Software may still provide SMS notification messages to the cellular phone device as described in an embodiment, except the URLs included in the messages may direct the cellular phone device's web browser to the web page provided by the System Server Software.

In an alternative embodiment of the invention, all Guardian, Responder, and by-stander functions, including communications among them, are performed by way of web pages provided by Java Servlets executing on the System Server Software. The web pages are viewed on the user's cellular phone device by way of a web browser provided by the cellular phone device, or by way of a web browser on either system such as a desktop computer, laptop, or handheld computer.

In alternative embodiments of the invention, the System Device Software functionality of an embodiment is replicated in other computer languages and for other mobile device operating systems such that the functionality is made available for other devices, including other cellular phones, mobile media devices, handheld computing devices, and special purpose hardware.

In an alternative embodiment of the invention, the System Device Software captures Responder preferences for hours of availability relative to Response Locations to allow the System Server Software to select the Responder to participate in a nearby search only during the hours of availability. By way of example, an employee of a store indicates a Response Location at their place of employment and indicates the hours of availability for the Response Location according to his/her work schedule so to not be enlisted during off hours in searches occurring near the place of employment.

In an alternative embodiment of the invention, the System Device Software and System Server Software send identifying information of the child in the form of a first visual image, such as a photograph, to an automated visual recognition system near the location of loss. The automated visual recognition system is able to review other images such as live and recorded video input from security cameras of a commercial establishment, and use algorithms to locate people and objects in the video based on similarity to a previously provided source image. In advance of a Missing Child Incident, the communications path and computer interface to the automated visual recognition system is determined and provisioned for access by the System Server Software. At such time as the incident occurs, the proximity of the Guardian to the visual recognition system is determined in a like manner to determining nearby human Responders. The identifying photo of the missing child is communicated to the visual recognition system, which then searches its video inputs for presence of the child. If the visual recognition system locates the child, it reports the presence and location of the child to the System Server Software. The System Server Software then notifies the Guardian and Responders, and directs them to the location of the child.

In an alternative embodiment of the invention, the System Device Software is used with other types of automated recognition systems that are capable of locating the child based on other types of identifying information that is captured in Guardian preferences, such as voice samples, scent samples, genetic samples, and other types of biometrics.

In an alternative embodiment of the invention, the System Device Software prompts the Guardian at the time of loss declaration to confirm that the most recent photo of the child displays what the child was wearing at the time of the Missing Child Incident. The response of the Guardian is provided to Responders along with the photo to improve the efficiency and effectiveness of the search.

In an alternative embodiment of the invention, the System Device Software generates and discloses exclusively to a given pair of Users a unique shared secret, such as a numeric code, that can be used by one of the Users to verify the identity of the other User. By way of example, this process may provide to the Responder certainty of the identity of the Guardian before turning a found child over to the Guardian, or may provide to the Guardian certainty of the identity of the Responder when wishing to disclose to the Responder additional identifying details of the child by way of a phone conversation.

In an alternative embodiment of the invention, logic flows attributed to the System Server Software of an embodiment are performed as logic flows of the System Device Software such that functions of the present invention are provided without need for the System Server Software and system servers 10 of FIG. 1. By way of example, the Guardian uses the System Device Software to maintain in user preferences on the cellular phone 1 of FIG. 1 a list of identifying information of desired Responders including their cell phone numbers. Following a Missing Child Incident, the System Device Software communicates by way of a SMS with the System Device Software of the desired Responders to coordinate the incident amongst these Responders and the Guardian. Also by way of example, the Guardian may rely on the System Device Software to dynamically discover nearby Responders using the Bonjour capabilities of the iPhone OS as described in the Introduction to NSNetServices and CFNetServices Programming Guide and CFNetServices Reference documentation provided commercially by Apple, and then proceed with coordination of the Missing Child Incident as in the previous example.

In an alternative embodiment of the invention, functions of the System Device Software of the present invention may be performed with no electrical connection between the Guardian cellular phone or media device, and any external system or device. By way of example, a Guardian may store images of a child on their device, be reminded by the System Device Software to update the images, declare to the System Device Software that the child is missing, visually display the stored images to bystanders and/or other search participants to improve the efficiency and effectiveness of the search, and declare the recovery of the child to the System Device Software.

In an alternative embodiment of the invention, the System Server Software is executed on system servers that are located on local networks and accessible to the Guardian and Responder cellular phones 1 and 3 respectively without need for Internet access through communications network 6 of FIG. 1. By way of example, an amusement park operator may install and operate System Server Software on system servers located in the amusement park facility, and communicate with System Device Software of Guardian and Responder cellular phones 1 and 3 respectively by way of local Wi-Fi networks that may not be connected to communications network 6 of FIG. 1.

In an alternative embodiment of the invention, when during a Missing Child Incident the System Device Software determines that the System Server Software is temporarily unreachable, the System Device Software sends update messages directly to other User devices by way of SMS, MMS or TCP/IP messages if the other devices are still reachable by way of local Wi-Fi networks along wireless communications path 2 of FIG. 1 or by way of cellular communications network 6.

In an alternative embodiment of the invention, during a Missing Child Incident the System Device Software of Guardian cellular phone 1 and Responder cellular phone 3 continuously or periodically report the geographic location of the Guardian and Responder respectively to the System Server Software. The System Server Software then records the location of all search participants, track search progress, use criteria to evaluate search progress, suggest new search patterns for maximal results, and provide search instructions to Responders. By way of example, the System Server Software may analyze the path taken by Responders to determine what geographic locations have been searched, and send a request to a Responder either to search a particular location that had not previously been searched, or to avoid duplication of effort by searching a particular location that had already been searched. Also by way of example, the analysis of the search effort may involve comparison of Responder search paths to a known map of a facility such as of a building or amusement park.

In an alternative embodiment of the invention, when a Responder has found the child and the system of an embodiment of the present invention has been notified of the location of one or more of the Guardian and the Responder, the system provides information to guide the Guardian or Responder to the location of the other, or guide both the Guardian and the Responder to some third location. By way of example, the System Device Software of the Guardian device may display a map highlighting the location of the Responder who found the child to enable the Guardian to travel to that location.

In an alternative embodiment of the invention, a web-based user interface is provided by Java Servlets of the System Server Software to allow human input to the logic flows of the System Server Software. By way of example, a shopping mall having designated security personnel available as potential Responders in their facility also has a designated security manager interact with the System Server Software by way of a web browser of computer 16 of FIG. 1 to designate certain personnel to participate in a given Missing Child Incident, to review and request modification of the search patterns, and to make a manual decision to escalate the incident to include additional Responders and law enforcement.

In an alternative embodiment of the invention, the System Server Software collects, organizes, analyzes and provides statistics of Missing Child Incidents, and of User actions. By way of example, such statistics may be used to improve the function, efficiency, and effectiveness of the system, to educate Users in the use of the system, to educate the general public about Missing Child Incidents, and to provide valuable information to law enforcement and emergency response personnel.

In an alternative embodiment of the invention, the Guardian or Responder provides input to the System Device Software to indicate the child is in danger, and to classify the type of danger such as risk of physical injury, risk of abduction, risk of leaving the search area, and so forth. This information then is provided by the System Device Software to other Users and to the System Server Software so that appropriate action may be taken. By way of example, a Responder indicating they found a child at risk of physical injury may cause the System Server Software to immediately send an automated request for medical services. Also by way of example, a Responder may find clothing of a missing child and indicate by using the System Device Software that the child is at risk of abduction, which may cause the System Server Software to immediately request the involvement of one or more of law enforcement, medical vehicles, air planes, helicopters, and all-terrain rescue vehicles.

In an alternative embodiment of the invention, the System Device Software periodically stores information that would be useful in the event that elements of the system of FIG. 1 become unreachable or unavailable. By way of example, the System Device Software stores its last known geographical location to prepare for the possible interruption by buildings of signals from GPS satellites; requests or receives from the System Server Software and stores in local device storage a list of nearby potential Responders to prepare for loss of access to the System Server Software; requests or receives from the System Server Software and stores in local device storage a list of alternative contact information such as nearby helpdesk, security, and law enforcement phone numbers to prepare for loss of access to the System Server Software or potential Responders; and requests or receives from the System Server Software and stores in local device storage a list of alternative System Server Software installations to act as alternates in case the primary System Server Software installation is unreachable or to act as an alternate that provides functionality more specialized for a given geographic area.

In an alternative embodiment of the invention, the System Device Software provides through the user interface the ability of a Responder to explicitly accept or decline participation in an Incident. If the Responder declines participation, the System Device Software withholds identifying information of the missing child to preserve privacy.

In an alternative embodiment of the invention, the System Server Software selects Responders based on a broader variety of factors such as whether the Responder's current location is near one of his/her Response Locations, whether the identity of the Responder has been independently verified, whether the Responder has known affiliation with a trusted community or organization, whether the Responder was explicitly designated in advance by the Guardian, whether the Responder has a record of successful searches, and whether the Responder has a record of child abuse. The System Device Software allows the Guardian to select from available factors to determine how Responders would be selected to participate in an Incident. In some embodiments, the System Server Software eliminates certain Responders and/or bystanders based upon knowledge of their history as being a criminal, felon, sex offender, or other such undesirable.

In an alternative embodiment of the invention, the System Server Software provides one or more of notification of a Missing Child Incident, identifying information of the child and Guardian, and information about the progress of a search, to witnesses, bystanders and others by way of public notification methods such as Cell Broadcast, public address systems, and public display systems used to display Amber Alert information to public roadways.

In an alternative embodiment of the invention, when a Responder has declared by way of the System Device Software that he/she has found a missing child, the System Device Software provides a button in the user interface of FIG. 17 that retracts the declaration and notifies the Guardian and search participants of the retraction. By way of example, a Responder might declare on the basis of visual contact from some distance that he/she has found the missing child, only to discover after approaching the child that the Responder was mistaken about the identity of the child. The Responder then may use the System Device Software to retract the declaration.

In an alternative embodiment of the invention, use of the system of an embodiment of the present invention is closed to all but certain participants through the use of communications supporting access restrictions and encryption of data transmissions. By way of example, the Wi-Fi standard includes the ability to restrict access to network communications by requiring knowledge of a private password in order to participate on the network. Also by way of example, Wi-Fi defines standards for encryption of the data communicated over the network to ensure that those not authorized to participate in the network cannot read data in intercepted wireless signals.

In an alternative embodiment of the invention, when updates of the current location of the Guardian indicate departure from geographic locations of relative safety, the system prompts the Guardian to update identifying information of the child. By way of example, the Guardian may be prompted for updates when they leave home, or when they leave an area having a large number of Responders or Responders having specialized attributes.

In an alternative embodiment of the invention, a user interface allows a User to define, in his/her user preferences, locations that may trigger the system to remind the User to update identifying information of a child. By way of example, a web-based user interface accessible by way of computer systems 12 of FIG. 1 may be used to designate geographic locations believed by the User to pose risks to the child such that the User will later be reminded to avoid the area, or, should the User enter or go near the area the User will be reminded to update a photo of the child in his/her current clothing.

In an alternative embodiment of the invention, a web-based user interface is provided by Java Servlets of the System Server Software and is accessible by way of computers 12 of FIG. 1 to allow a first User to share with a second User the locations the first User has defined in his/her user preferences as locations the system should remind the first User to update with identifying information of a child. The second User may subscribe to the list of locations of the first User such that future changes to the locations of the first User are automatically available for use by the second User as though the second User had made the changes to his/her own user preferences. The web interface allows a first group of Users to contribute changes to a shared set of locations, and the shared set of locations are made available for use to an even larger second group of Users. By way of example, the first group of Users may be a well-known civic organization of a city that contributes to a shared set of risk locations of the city that pose risks to children, while the second group of Users subscribing to the shared set of risk locations of the city may include Guardians who are passing through the city on travel and who may lack the local knowledge to otherwise determine locations in the city where their child may be at risk.

In an alternative embodiment of the invention, in a like manner to the previous alternative embodiment a group of Users define and share one or more Response Location(s), and one or more Responders subscribe to the shared Response Location(s). By way of example, a security manager for a commercial establishment may define the geographical business locations of the commercial establishment as a shared set of Response Locations, and employees of the commercial establishment may easily adopt the shared set of Response Locations as their own Response Locations without each employee having to define each of the included Response Locations in his/her own user preferences.

In an alternative embodiment of the invention, the danger and safety locations in the user preferences of a Guardian are displayed collectively by the System Device Software on a map image to allow the Guardian to plan routes of travel that minimize the risk exposure to a child.

In an alternative embodiment of the invention, the danger and safety locations in the user preferences of a Guardian are provided to a travel guiding apparatus as described in U.S. Pat. No. 5,521,826. By way of use of danger and safety locations as a basis to assign or modify route segment costs in paths of travel as calculated by such devices, the devices may be made to produce routes of relative safety to the child in the same manner they would normally produce routes based on criteria such as traffic speed and congestion. By way of example, route planning may be performed based on a combination of factors including traffic congestion, traffic speeds, locations defined as relatively safe or dangerous to the child, and locations where relatively more or fewer Responders are currently available.

In an alternative embodiment of the invention, the system provides a series of photos of known terrorists or most wanted criminals to a large number of subscribers to facilitate locating them. In this embodiment a legal or military organization acts as the Guardian and solicits as many "eyes on the ground" as possible. When a Responder perceives a possible location of an object of a search, an incident report is generated as a found declaration, and the legal or military organization acts on the found declaration.

In an alternative embodiment of the invention, photos are collected on behalf of others without the others being registered users of the system. By way of example, a camera at the entrance of an establishment automatically takes photos of each person walking into the establishment. Some time later, recognizing that a parent has lost track of their child while in the store, an employee of the establishment uses the System Device Software to display photos of children who entered the store recently to allow the parent to identify which of the photos is of their child. A Missing Child Incident is then initiated using the identified photo as identifying information of the child and the employee fulfills the role of Guardian as a proxy for and in collaboration with the parent.

In an alternative embodiment of the invention, Users of the System Device Software produce recent photos of themselves for use in a search if they should become missing themselves. By way of example, a traveling businessperson updates photos of himself each day before departing his hotel. At such time as he might be feared missing by a spouse at home, by fellow employees, or parties recognizing a failure to appear at a business engagement, such persons use the system to declare the businessperson missing. The identifying information of the businessperson is then distributed to Responders selected for their potential ability to locate the businessperson. The person declaring the loss acts as a proxy Guardian. Also by way of example, such an embodiment would be useful for other persons entering potentially hazardous areas, such as police, firefighters, military personnel, families of military personnel stationed overseas, political refugees, diplomats, and witnesses under court protection.

Whereas in an embodiment of the invention a child of a Guardian is considered the subject of interest of individuals having roles described as Guardian and Responder, alternative embodiments of the present invention having objects of interest such as lost personal property or stolen goods, and different subjects of interest such as escaped prisoners, and requiring individuals having roles different from that of a Guardian or Responder, are within the scope of the disclosed embodiments of the invention. By way of example, an object of interest may be an automobile owned by an individual, and the owning individual could use an embodiment of the present invention to capture and store identifying information of the automobile, share such identifying information with other users interested in the recovery of automobiles if the vehicle were stolen, receive notification from such other users of the embodiment if they locate the automobile, and use the embodiment to facilitate recovery of the located automobile. By way of another example, an individual may find a lost set of keys, perhaps before the owner of the keys is even aware of the loss, and collect identifying information of the set of keys, share this information with others who may wish to locate the set of keys, receive a response from the owner of the set of keys, and arrange the return of the set of keys to the owner. By way of a further example, an owner of an object may use a system of the present invention to broadcast details of a desired sale of that object, participate in negotiations with potential buyers, and coordinate delivery of the object to a selected buyer.

Although particular embodiments of the invention have been described and illustrated herein, it is recognized that modifications, variations, and equivalents may readily occur to those skilled in the art, and consequently, it is intended that the Claims be interpreted to cover such modifications, variations, and equivalents. For example, wired communications and wireless communications may be interchanged in the invention embodiments disclosed herein, and electromagnetic and optical communication signals may be used as well as electrical signals.

All references cited herein are incorporated by reference. Although the invention has been disclosed with reference to its embodiments, from reading this description those of skill in the art may appreciate changes and modification that may be made which do not depart from the scope and spirit of the invention as described above and claimed hereafter.

We claim:

1. A system for managing a missing child incident, which comprises:
  a Guardian communications device for: (a) transmitting Guardian messages including pre-incident child identifying data, incident data, Guardian and child preference data, and other descriptive data concerning a missing child, where the transmitting comprises an immediate beginning of a search for a missing child, (b) receiving Responder messages and information concerning a status of a search for the missing child, (c) coordinating the search, and (d) when no update to the transmitted data has occurred for a designated period of time, prompting a Guardian of the missing child to update the transmitted data and promoting the Guardian when information relative to the search is received from participants in the search;
  at least one Responder communications device in wireless communication with the Guardian communications device and having a communication protocol compatible with the Guardian communications device for transmitting updates on Responder preference data, progress of the search, and location and recovery of the missing child;

a communications network in wireless communication with the Guardian communications device and the at least one Responder communications device for routing messages from the Guardian communications device and the at least one Responder communications device regarding the missing child, the missing child incident, and coordination of the search;

at least one system server connected to and in electrical communication with the communications network for independently controlling the search upon command of the Guardian, and for storing the Guardian messages and the Responder messages for access by the communications network for sharing with the Guardian and the at least one Responder; and an automated route planning component connected to and in electrical communication with the Guardian cellular phone or forming a part of the Guardian cellular phone to allow Guardian preference data including data concerning locations that pose a high risk of physical injury to a child, a risk of abduction of a child, or a risk of a child leaving the search area locations that pose a low risk to a child to be used in producing travel routes.

2. The system of claim 1 above, wherein at least one of the Guardian communications device and the at least one Responder communications device are media devices.

3. The system of claim 1, wherein the system includes at least one bystander communications device in wireless communication with the Guardian communications device, the at least one Responder communications device, and the communications network, and having a communication protocol compatible with the Guardian communications device for transmitting information concerning the missing child incident, and exchanging information with the Guardian communications device leading to a possible enlistment as a Responder.

4. The system of claim 3 above, wherein the at least one bystander communications device is in wireless communication with the Guardian communications device, the at least one Responder communications device, and the communications network, and has a communication protocol compatible with the Guardian communications device for receiving information concerning the missing child incident.

5. The system of claim 3 above, wherein the communications network is the Internet, and the Guardian communications device, the at least one Responder communications device, and the at least one bystander communications device communicate by way of web pages.

6. The system of claim 3 wherein the system includes a GPS satellite system in wireless communication with one or more of the Guardian communications device, the at least one Responder communications device, and the at least one bystander communications device for providing geographic location information.

7. The system of claim 1, wherein the system includes plural computer systems accessible by way of a network connection with the communications network for publishing an occurrence of the missing child incident, the pre-incident child identifying information, the other descriptive information of the missing child, and location and recovery of the missing child.

8. The system of claim 7, wherein the network connection is a public network.

9. The system of claim 1 wherein the Guardian communications device has stored therein a System Device Software for updating the incident data, the Guardian and child preference data, the other descriptive information of the missing child, and the status of the search.

10. The system of claim 1 wherein the at least one system server has stored therein a System Server Software for issuing prompts to the Guardian to periodically update information stored in the Guardian communications device, and the System Server Software tracks progress of the search and controls coordination of the search in response to a command from the Guardian communications device.

11. The system of claim 1 wherein the pre-incident child identifying data includes one or more of descriptive data, photographs, voice recordings, and biometric data of the missing child.

12. The system of claim 1 wherein the incident data includes one or more of time of occurrence, place of occurrence, and environment in which the missing child incident has occurred.

13. The system of claim 1 wherein the at least one system server has stored therein preference data including one or more of height, weight, color of clothing, color of skin, color of hair, color of eyes, list of Responders to contact, frequency of update reminders, data privacy guidelines for selection of Responders, criteria for expanding search to include third parties, criteria for escalating search, and criteria for deescalating search.

14. The system of claim 1 wherein the Guardian communications device is used to display at least one of photographs, the incident data, and the pre-incident child identifying data and child preference data, and to play voice recordings of the missing child for sharing with Responders and bystanders.

15. A system for managing a missing child incident, which comprises:

a Guardian cellular phone having a System Device Software for transmitting Guardian messages including pre-incident child identifying information and other descriptive information of a missing child, Guardian and child preference data, and incident data, where the transmitting comprises an immediate beginning of a search for a missing child, for receiving Responder messages, bystander messages, and computer system messages from other participants in a search for the missing child informing of progress of the search, and location and recovery of the missing child, for tracking and coordinating the search, and for prompting a Guardian of the missing child to update the transmitted data when no update to the transmitted data has occurred for a designated period of time;

plural Responder cellular phones each in wireless communication with the Guardian cellular phone, and each having a communication protocol compatible with the Guardian cellular phone for transmitting updates on progress of the search, and location and recovery of the missing child;

a GPS satellite system in wireless communication with the Guardian cellular phone and the plural Responder cellular phones for providing geographic location information;

plural bystander cellular phones having the communication protocol and a software system for wireless communication as permitted by the Guardian with the Guardian cellular phone, and the plural Responder cellular phones, for updating incident data and search data;

plural computer systems for communicating with search and rescue services, public media, and state and federal authorities including law enforcement, and for updating the search data by issuing the computer system messages;

a communications network in wireless communication with the Guardian cellular phone, the plural Responder cellular phones, the plural bystander cellular phones, and connected by way of an Internet connection to the plural computer systems for exchanging messages regarding the missing child, the missing child incident, and tracking and coordination of the search;

at least one system server connected to and in electrical communication with the communications network and having a System Server Software for independently controlling coordination of the search upon command of the Guardian, and for storing the Guardian messages, the Responder messages, the bystander messages, and the computer system messages for access by the communications network to share with search participants in locating and recovering the missing child; and an automated route planning component connected to and in electrical communication with the Guardian cellular phone or forming a part of the Guardian cellular phone to allow Guardian preference data including data concerning locations that pose a high risk of physical injury to a child, a risk of abduction of a child, or a risk of a child leaving the search area locations that pose a low risk to a child to be used in producing travel routes.

16. The system of claim 15 further including a visual recognition system connected to and in communication with the communications network for comparing a first visual image of the missing child with a second visual image of the missing child received from any one of the Guardian, plural Responders, plural bystanders, the public media, the law enforcement, and the search and rescue services to locate the missing child.

17. The system of claim 15 further including an automated recognition system connected to and in electrical communication with the communications network for identifying the missing child from biometrics including one or more of body measurements, voice samples, scent samples, and genetic samples.

18. The system of claim 15, wherein the System Device Software also performs the functions of the system System Server Software.

19. The system of claim 15, wherein the communications network is one of a closed or an open Wi-Fi network.

20. The system of claim 15, wherein the Guardian cellular phone and the plural Responder cellular phones periodically communicate with the GPS satellite system to determine their respective search paths that are stored by way of the communications network in the at least one system server for analysis in coordinating the search.

21. The system of claim 15, wherein coordination of the search may be controlled by any one of the System Device Software, the System Server Software, and the computer systems.

22. The system of claim 15, wherein the System Server Software analyzes and produces statistics based on available historical data, the pre-incident data, the incident data, the search data, the Guardian and child preference data, the Responder preference data, and actions of the Guardian, plural Responders, plural bystanders, and the other participants in the search, to aid in coordinating the search, and recovering the missing child.

23. The system of claim 15, wherein the System Device Software receives notice of a risk of danger to the missing child and issues messages to alert one or more of the other participants in the search, the System Server Software, the search and rescue services, and the law enforcement of the risk of danger.

24. The system of claim 15, wherein the System Device Software periodically requests from the System Server Software, and stores for use in event of loss of access to one or more components of the system, location and contact information of at least one of the Guardian cellular phone, the plural Responder cellular phones, plural bystanders, the communications network, nearby potential Responders, search and rescue service organizations, and law enforcement.

25. The system of claim 15, wherein the System Device Software allows the Guardian to select among factors describing Responders to better match selection of Responders with personal preferences and search requirements.

26. The system of claim 15, wherein the System Server Software prompts the System Device Software of the Guardian cellular phone to update transmitted data concerning of the missing child when the Guardian leaves an area of safety, where the number of available Responders is high or Responders having specialized attributes.

27. The system of claim 15, wherein the System Server Software provides a user interface accessible by way of one or more of the plural computer systems, the Guardian cellular phone, the plural Responder cellular phones, and the plural bystander cellular phones to allow users of the plural computer systems to share information identifying locations that pose a high risk of physical injury to a child, a high risk of abduction of a child, or a high risk of a child leaving the search area.

28. The system of claim 15 wherein the System Device Software of the Guardian cellular phone displays locations that pose a high risk of physical injury to a child, a high risk of abduction of a child, or a high risk of a child leaving the search area locations that pose a low risk to a child superimposed on a map of a geographical area to allow the Guardian to plan routes of travel of minimized risk.

* * * * *